(12) United States Patent
Asano et al.

(10) Patent No.: US 10,688,601 B2
(45) Date of Patent: Jun. 23, 2020

(54) ALUMINUM ALLOY CLADDING MATERIAL AND MANUFACTURING METHOD THEREFOR

(71) Applicants: DENSO Corporation, Kariya-shi, Aichi (JP); UACJ CORPORATION, Tokyo (JP)

(72) Inventors: Taichi Asano, Kariya (JP); Masaki Harada, Kariya (JP); Shoei Teshima, Kariya (JP); Makoto Ando, Tokyo (JP); Naoki Yamashita, Tokyo (JP)

(73) Assignees: DENSO CORPORATION, Kariya-shi (JP); UACJ CORPORATION, Tokyo (JP)

( * ) Notice: Subject to any disclaimer, the term of this patent is extended or adjusted under 35 U.S.C. 154(b) by 216 days.

(21) Appl. No.: 15/742,393

(22) PCT Filed: Jul. 8, 2016

(86) PCT No.: PCT/JP2016/070278
§ 371 (c)(1),
(2) Date: Jan. 5, 2018

(87) PCT Pub. No.: WO2017/007020
PCT Pub. Date: Jan. 12, 2017

(65) Prior Publication Data
US 2018/0193960 A1   Jul. 12, 2018

(30) Foreign Application Priority Data

Jul. 8, 2015  (JP) ................... 2015-137332
Jul. 4, 2016  (JP) ................... 2016-132728

(51) Int. Cl.
*B23K 35/28* (2006.01)
*F28F 21/08* (2006.01)
(Continued)

(52) U.S. Cl.
CPC ........ *B23K 35/288* (2013.01); *B23K 35/0238* (2013.01); *B23K 35/286* (2013.01);
(Continued)

(58) Field of Classification Search
None
See application file for complete search history.

(56) References Cited

U.S. PATENT DOCUMENTS

2009/0165901 A1   7/2009   Koshigoe et al.
2010/0101688 A1   4/2010   Koshigoe et al.
(Continued)

FOREIGN PATENT DOCUMENTS

CN   101469960 A   7/2009
CN   101641454 A   2/2010
(Continued)

OTHER PUBLICATIONS

Office Action dated Feb. 25, 2019, issued for the corresponding CN patent application No. 201680035515.2 and the English translation.
(Continued)

*Primary Examiner* — Daniel J. Schleis
(74) *Attorney, Agent, or Firm* — Greer Burns & Crain Ltd.

(57) ABSTRACT

Provided is an aluminum alloy clad material including an aluminum alloy core material, an intermediate layer material that is clad on one surface of the core material, and a first brazing filler metal that is clad on a surface of the intermediate layer material, the surface not being on the core material side, wherein the core material, the intermediate layer material, and the first brazing filler metal each include an aluminum alloy having a predetermined composition, the existence density of Al—Mn based intermetallic compounds having a circle-equivalent diameter between 0.1 and 1.0 μm inclusive in the intermediate layer material before brazing
(Continued)

heating is at least $1.0 \times 10^5$ pieces/mm$^2$, and the existence density of Al—Mn based intermetallic compounds having a circle-equivalent diameter between 0.1 and 1.0 μm inclusive in the intermediate layer material after brazing heating is at least $1.0 \times 10^4$ pieces/mm$^2$. Further provided is a method for producing the aluminum alloy clad material.

6 Claims, 1 Drawing Sheet

(51) Int. Cl.

| | |
|---|---|
| *B32B 15/01* | (2006.01) |
| *C22F 1/04* | (2006.01) |
| *C22C 21/00* | (2006.01) |
| *B23K 35/02* | (2006.01) |
| *C22C 21/02* | (2006.01) |
| *C22C 21/08* | (2006.01) |
| *C22C 21/10* | (2006.01) |
| *C22F 1/047* | (2006.01) |
| *C22F 1/053* | (2006.01) |
| *F28D 1/03* | (2006.01) |

(52) U.S. Cl.
CPC ............ *B32B 15/016* (2013.01); *C22C 21/00* (2013.01); *C22C 21/02* (2013.01); *C22C 21/08* (2013.01); *C22C 21/10* (2013.01); *C22F 1/04* (2013.01); *C22F 1/047* (2013.01); *C22F 1/053* (2013.01); *F28F 21/089* (2013.01); *F28D 1/0325* (2013.01); *F28D 1/0333* (2013.01); *F28F 21/084* (2013.01); *F28F 2245/00* (2013.01); *F28F 2275/04* (2013.01); *Y10T 428/12764* (2015.01)

(56) References Cited

U.S. PATENT DOCUMENTS

| | | |
|---|---|---|
| 2010/0263768 A1 | 10/2010 | Hisatomi et al. |
| 2011/0123305 A1 | 5/2011 | Sueyoshi et al. |
| 2011/0287276 A1 | 11/2011 | Izumi et al. |

FOREIGN PATENT DOCUMENTS

| | | |
|---|---|---|
| CN | 101871063 A | 10/2010 |
| CN | 102251155 A | 11/2011 |
| JP | 9-268338 | 10/1997 |
| JP | 10-158769 | 6/1998 |
| JP | 2005-523164 A | 8/2005 |
| JP | 2010158769 A | 7/2010 |
| JP | 2014-055326 A | 3/2014 |
| JP | 2014-189813 A | 10/2014 |

OTHER PUBLICATIONS

Int'l. Search Report issued in Int'l. App. No. PCT/JP2016/070278, dated Oct. 11, 2016.

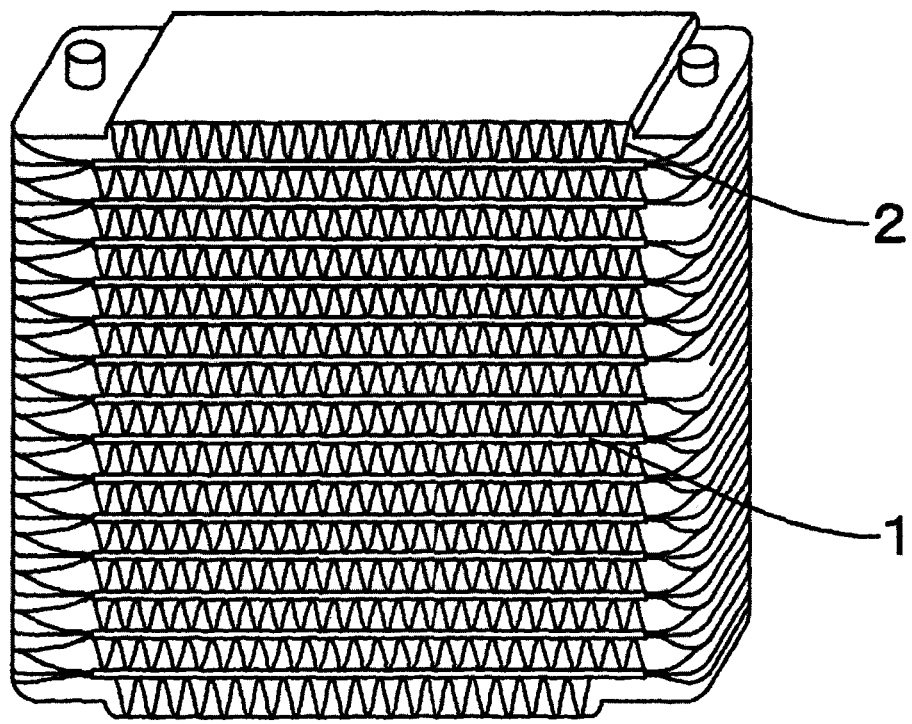

ALUMINUM ALLOY CLADDING MATERIAL AND MANUFACTURING METHOD THEREFOR

This is a National Phase Application filed under 35 U.S.C. § 371, of International Application No. PCT/JP2016/070278, filed Jul. 8, 2016, the contents of which are incorporated by reference.

TECHNICAL FIELD

The present disclosure relates to an aluminum alloy clad material and a method for producing the same, the aluminum alloy clad material having high corrosion resistance and being suitably used as a passage forming member for a coolant or high-temperature compressed air in a heat exchanger, such as a radiator. The highly corrosion-resistant aluminum alloy clad material according to the present disclosure is suitably used as a passage forming component for an automotive heat exchanger.

BACKGROUND ART

An aluminum alloy is lightweight and has high thermal conductivity, and also achieves high corrosion resistance when properly treated. Thus, aluminum alloys are used for heat exchangers for automotive and other applications, such as radiators, condensers, evaporators, heaters, intercoolers, and oil coolers. Conventional tube materials for automotive heat exchangers include, for example, a two-layer clad material and a three-layer clad material, where the two-layer clad material has a core material made of an Al—Mn based alloy, such as 3003 alloy, and a brazing filler metal made of an Al—Si based alloy or a sacrificial anode material made of an Al—Zn based alloy that is clad on one surface of the core material, while the three-layer clad material additionally has a brazing filler metal made of an Al—Si alloy that is clad on the other surface of the core material. For a heat exchanger, in general, such clad material and a corrugated fin material are combined and brazed at a temperature as high as about 600° C. to be joined together.

Oil coolers, for example, usually employ a water cooling system in which heat is exchanged between engine oil and cooling water to cool the engine oil. Nowadays some intercoolers also employ such water cooling system. As the cooling water, an LLC containing an anti-corrosive agent as an additive should be used, but tap water or well water may sometimes be used in developing countries, for example. The tap water or well water can contain chloride ions, and thus may destroy a film of aluminum oxide to cause pitting corrosion, resulting in corrosion perforation in the passage for cooling water.

A typical countermeasure against this problem is cladding a sacrificial anode material made of an Al—Zn based alloy to give the sacrificial protection feature, so as to prevent the corrosion perforation caused by pitting corrosion. One method for forming a passage for cooling water in a heat exchanger includes stacking plates 1, which are made by forming a clad material into a passage for cooling water, via corrugated fins 2 as illustrated in FIG. 1. This method is advantageous because a heat exchanger can be changed in size merely by changing the number of stacks, thus providing higher design flexibility. However, to join plates together, the plate material itself is needed to supply a brazing filler metal during brazing. In addition, when Zn is used to give the aforementioned sacrificial protection feature, Zn becomes concentrated in the brazing filler metal that has gathered on a joint portion. This results in the problem that the pitting potential in the joint portion becomes significantly less noble to cause preferential corrosion in the joint portion.

In light of the foregoing, in order to apply the stacked-plate type to a water-cooling heat exchanger as seen in FIG. 1, it is necessary to clad layers that have a plurality of functions including: supplying a brazing filler metal during brazing to the inner side of the passage made of a material used for the passage forming component; having a sacrificial protection feature against pitting corrosion; and preventing preferential corrosion in the joint portion.

Techniques for supplying a brazing filler metal during brazing and giving a sacrificial protection feature against pitting corrosion are described in Patent Literatures 1 and 2. These patent literatures state that an Al—Zn based intermediate layer having the sacrificial protection feature is disposed between the brazing filler metal and the core material, with the result that both the brazability and the sacrificial protection feature can be accomplished. However, these patent literatures neither recognize the problem of preferential corrosion in a joint portion nor describe any method for preventing such problem.

CITATION LIST

Patent Literature

Patent Literature 1 Unexamined Japanese Patent Application Kokai Publication No. H9-268338
Patent Literature 2 Unexamined Japanese Patent Application Kokai Publication No. H10-158769

SUMMARY OF INVENTION

Technical Problem

As described above, when an aluminum alloy clad material is used as, for example, a passage forming component material for a heat exchanger, conventional techniques have difficulty in providing the aluminum alloy clad material that prevents preferential corrosion in a joint portion in addition to supplying a brazing filler metal during brazing heating and providing a sacrificial protection feature after the brazing heating.

The present disclosure has been accomplished with the intent to solve the above-described problems, and objectives of the disclosure include providing a highly corrosion-resistant aluminum alloy clad material that supplies a brazing filler metal during brazing heating, provides a sacrificial protection feature after the brazing heating, and can prevent preferential corrosion in a joint portion, and providing a method for producing such aluminum alloy clad material.

Solution to Problem

The present inventors have conducted intensive studies on the foregoing problems. As a result, the inventors have found that the problems can be solved by preparing a core material, (first and second) brazing filler metals, and an intermediate layer material each having a specific alloy composition and metal structure, and by producing a clad material in which one surface of the core material is clad with the intermediate layer material, whose surface is further clad with the first brazing filler metal, and also by using the clad material to produce a clad material in which the other surface of the core material is clad with either the second brazing filler metal or the sacrificial anode material, and the inventors have eventually accomplished the present disclosure.

In claim 1 of the present disclosure, an aluminum alloy clad material includes: a core material including an aluminum alloy; an intermediate layer material that is clad on one surface of the core material; and a first brazing filler metal that is clad on a surface of the intermediate layer material, the surface not being on the core material side, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the intermediate layer material includes an aluminum alloy containing Zn: 0.5 to 8.0 mass %, Si: 0.05 to 1.50 mass %, Fe: 0.05 to 2.00 mass %, and Mn: 0.05 to 0.50 mass %, with the balance consisting of Al and inevitable impurities, wherein the first brazing filler metal includes an aluminum alloy containing Si: 8.0 to 13.0 mass %, Fe: 0.05 to 1.20 mass %, and Cu: 0.05 to 0.50 mass %, with the balance consisting of Al and inevitable impurities, wherein an existence density of Al—Mn based intermetallic compounds having a circle-equivalent diameter between 0.1 and 1.0 inclusive in the intermediate layer material before brazing heating is at least $1.0 \times 10^5$ pieces/mm$^2$, and wherein an existence density of Al—Mn based intermetallic compounds having a circle-equivalent diameter between 0.1 and 1.0 µm inclusive in the intermediate layer material after brazing heating is at least $1.0 \times 10^4$ pieces/mm$^2$.

In claim 2 of the present disclosure, the core material according to claim 1 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 3 of the present disclosure, the intermediate layer material according to claim 1 or 2 includes the aluminum alloy further containing at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 4 of the present disclosure, the first brazing filler metal according to any one of claims 1 to 3 includes the aluminum alloy further containing at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 5 of the present disclosure, the first brazing filler metal according to any one of claims 1 to 4 includes the aluminum alloy further containing at least one selected from Na: 0.001 to 0.050 mass % and Sr: 0.001 to 0.050 mass %.

In claim 6 of the present disclosure, a method for producing the aluminum alloy clad material according to any one of claims 1 to 5 includes: a step of casting the aluminum alloys for the core material, the intermediate layer material, and the first brazing filler metal, respectively; a hot rolling step of hot rolling each of ingots of the cast intermediate layer material and the cast first brazing filler metal to a predetermined thickness; a cladding step of obtaining a clad material by cladding the intermediate layer material that has been hot rolled to a predetermined thickness on one surface of the ingot of the core material, and by cladding the first brazing filler metal that has been hot rolled to a predetermined thickness on a surface of the clad intermediate layer material, the surface not being on the core material side; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the intermediate layer material includes a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 650° C. inclusive and a holding time is at least one hour, and wherein a time period during which the intermediate layer material is at a temperature of at least 400° C. in the hot rolling stage is at least 5 minutes.

In claim 7 of the present disclosure, an aluminum alloy clad material includes: a core material including an aluminum alloy; an intermediate layer material that is clad on one surface of the core material; a first brazing filler metal that is clad on a surface of the intermediate layer material, the surface not being on the core material side; and a second brazing filler metal that is clad on another surface of the core material, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the intermediate layer material includes an aluminum alloy containing Zn: 0.5 to 8.0 mass %, Si: 0.05 to 1.50 mass %, Fe: 0.05 to 2.00 mass %, and Mn: 0.05 to 0.50 mass %, with the balance consisting of Al and inevitable impurities, wherein the first brazing filler metal includes an aluminum alloy containing Si: 8.0 to 13.0 mass %, Fe: 0.05 to 1.20 mass %, and Cu: 0.05 to 0.50 mass %, with the balance consisting of Al and inevitable impurities, wherein the second brazing filler metal includes an aluminum alloy containing Si: 2.5 to 13.0 mass % and Fe: 0.05 to 1.20 mass %, with the balance consisting of Al and inevitable impurities, wherein an existence density of Al—Mn based intermetallic compounds having a circle-equivalent diameter between 0.1 and 1.0 µm inclusive in the intermediate layer material before brazing heating is at least $1.0 \times 10^5$ pieces/mm$^2$, and wherein an existence density of Al—Mn based intermetallic compounds having a circle-equivalent diameter between 0.1 and 1.0 µm inclusive in the intermediate layer material after brazing heating is at least $1.0 \times 10^4$ pieces/mm$^2$.

In claim 8 of the present disclosure, the core material according to claim 7 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 9 of the present disclosure, the intermediate layer material according to claim 7 or 8 includes the aluminum alloy further containing at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 10 of the present disclosure, the first brazing filler metal according to any one of claims 7 to 9 includes the aluminum alloy further containing at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 11 of the present disclosure, the first brazing filler metal according to any one of claims 7 to 10 includes the aluminum alloy further containing at least one selected from Na: 0.001 to 0.050 mass % and Sr: 0.001 to 0.050 mass %.

In claim 12 of the present disclosure, the second brazing filler metal according to any one of claims 7 to 11 includes the aluminum alloy further containing, in addition to aforementioned component elements, at least one selected from Zn: 0.5 to 8.0 mass %, Cu: 0.05 to 1.50 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.3 mass %.

In claim 13 of the present disclosure, the second brazing filler metal according to any one of claims 7 to 12 includes the aluminum alloy further containing at least one selected from Na: 0.001 to 0.050 mass % and Sr: 0.001 to 0.050 mass %.

In claim 14 of the present disclosure, a method for producing the aluminum alloy clad material according to any one of claims 7 to 13 includes: a step of casting the aluminum alloys for the core material, the intermediate layer material, the first brazing filler metal, and the second brazing filler metal, respectively; a hot rolling step of hot rolling each of ingots of the cast intermediate layer material, the cast first brazing filler metal, and the cast second brazing filler metal to a predetermined thickness; a cladding step of obtaining a clad material by cladding the intermediate layer material that has been hot rolled to a predetermined thickness on one surface of the ingot of the core material, by cladding the first brazing filler metal that has been hot rolled to a predetermined thickness on a surface of the clad intermediate layer material, the surface not being on the core material side, and by cladding the second brazing filler metal that has been hot rolled to a predetermined thickness on another surface of the ingot of the core material; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the intermediate layer material includes a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 650° C. inclusive and a holding time is at least one hour, and wherein a time period during which the intermediate layer material is at a temperature of at least 400° C. in the hot rolling stage is at least 5 minutes.

In claim 15 of the present disclosure, an aluminum alloy clad material includes: a core material including an aluminum alloy; an intermediate layer material that is clad on one surface of the core material; a first brazing filler metal that is clad on a surface of the intermediate layer material, the surface not being on the core material side; and a sacrificial anode material that is clad on another surface of the core material, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the intermediate layer material includes an aluminum alloy containing Zn: 0.5 to 8.0 mass %, Si: 0.05 to 1.50 mass %, Fe: 0.05 to 2.00 mass %, and Mn: 0.05 to 0.50 mass %, with the balance consisting of Al and inevitable impurities, wherein the first brazing filler metal includes an aluminum alloy containing Si: 8.0 to 13.0 mass %, Fe: 0.05 to 1.20 mass %, and Cu: 0.05 to 0.50 mass %, with the balance consisting of Al and inevitable impurities, wherein the sacrificial anode material includes an aluminum alloy containing Zn: 0.5 to 8.0 mass %, Si: 0.05 to 1.50 mass %, Fe: 0.05 to 2.00 mass %, with the balance consisting of Al and inevitable impurities, wherein an existence density of Al—Mn based intermetallic compounds having a circle-equivalent diameter between 0.1 and 1.0 µm inclusive in the intermediate layer material before brazing heating is at least $1.0 \times 10^5$ pieces/mm², and wherein an existence density of Al—Mn based intermetallic compounds having a circle-equivalent diameter between 0.1 µm and 1.0 µm inclusive in the intermediate layer material after brazing heating is at least $1.0 \times 10^4$ pieces/mm².

In claim 16 of the present disclosure, the core material according to claim 15 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 17 of the present disclosure, the intermediate layer material according to claim 15 or 16 includes the aluminum alloy further containing at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 18 of the present disclosure, the first brazing filler metal according to any one of claims 15 to 17 includes the aluminum alloy further containing at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 19 of the present disclosure, the first brazing filler metal according to any one of claims 15 to 18 includes the aluminum alloy further containing at least one selected from Na: 0.001 to 0.050 mass % and Sr: 0.001 to 0.050 mass %.

In claim 20 of the present disclosure, the sacrificial anode material according to any one of claims 15 to 19 includes the aluminum alloy further containing at least one selected from Ni: 0.05 to 2.00 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %.

In claim 21 of the present disclosure, a method for producing the aluminum alloy clad material according to any one of claims 15 to 20 includes: a step of casting the aluminum alloys for the core material, the intermediate layer material, the first brazing filler metal material, and the sacrificial anode material, respectively; a hot rolling step of hot rolling each of ingots of the cast intermediate layer material, the cast first brazing filler metal, and the cast sacrificial anode material to a predetermined thickness; a cladding step of obtaining a clad material by cladding the intermediate layer material that has been hot rolled to a predetermined thickness on one surface of the ingot of the core material, by cladding the first brazing filler metal that has been hot rolled to a predetermined thickness on a surface of the clad intermediate layer material, the surface not being on the core material side, and by cladding the sacrificial anode material that has been hot rolled to a predetermined thickness on another surface of the ingot of the core material; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the intermediate layer material includes a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 650° C. inclusive and a holding time is at least one hour, and wherein a time period during which the intermediate layer material is at a temperature of at least 400° C. in the hot rolling stage is at least 5 minutes.

Advantageous Effects of Invention

According to the present disclosure, there are provided an aluminum alloy clad material and a method for producing the same material, the aluminum alloy clad material supplying a brazing filler metal during brazing heating, having a sacrificial protection feature after the brazing heating, and preventing preferential corrosion in a joint portion when used as, for example, a passage forming component material for a heat exchanger. This clad material is suitably used as a passage forming component material for automotive heat exchangers because the clad material is lightweight, has good heat conductivity, and has excellent brazability such as erosion resistance.

BRIEF DESCRIPTION OF DRAWING

FIG. 1 is a perspective view of a heat changer in which plates are stacked via corrugated fins, the plates being formed of a clad material and serving as a passage for cooling water.

DESCRIPTION OF EMBODIMENTS

Preferred embodiments of a highly corrosion-resistant aluminum alloy clad material and of a method for producing the aluminum alloy clad material will now be described in detail.

1. Layers Forming Aluminum Alloy Clad Material

The aluminum alloy clad material according to a first embodiment of the present disclosure has excellent corrosion resistance owing to appropriate control of the alloy composition and metal structure of an intermediate layer material that is clad on one surface of a core material, and appropriate control of the alloy composition of a first brazing filler metal that is clad on the surface of the intermediate layer material, the surface not being on the core material side. Concerning the aluminum alloy clad material according to the first embodiment, no specific limitation is imposed on cladding on the other surface of the core material. For example, if the other surface is not exposed to any corrosive environment and a clad fin is used on the other surface, as in a condenser or evaporator, the other surface of the core material may have nothing clad thereon. In contrast, when a bare fin is to be joined through brazing, a second brazing filler metal may be clad on the other surface of the core material of the first embodiment, which produces an aluminum alloy clad material according to a second embodiment of the present disclosure. If the other surface of the core material is also exposed to a corrosive environment, a sacrificial anode material may be clad on the other surface of the core material of the first embodiment, which produces an aluminum alloy clad material according to a third embodiment of the present disclosure.

The following describes alloy components of the first brazing filler metal, the intermediate layer material, the core material, the second filler metal, and the sacrificial anode material.

2. First Brazing Filler Metal

An aluminum alloy used for the first brazing filler metal contains Si: 8.0 to 13.0 mass % ("mass %" is hereinafter simply denoted as "%"), Fe: 0.05 to 1.20 mass %, and Cu: 0.05 to 0.50% as essential elements, with the balance consisting of Al and inevitable impurities.

The first brazing filler metal may further contain, as first selective added element(s), at least one selected from Zn: 0.5 to 8.0%, Mn: 0.05 to 2.00%, Ti: 0.05 to 0.30%, Zr: 0.05 to 0.30%, Cr: 0.05 to 0.30%, and V: 0.05 to 0.30%. The first brazing filler metal may further contain, as second selective added element(s), at least one selected from Na: 0.001 to 0.050% and Sr: 0.001 to 0.050%. In addition to the above-mentioned essential elements and first and second selective added elements, the first brazing filler metal may contain inevitable impurities of 0.05% or less for each impurity and 0.15% in total. The following describes the individual components.

Si:

Addition of Si lowers the melting point of the first brazing filler metal to generate a liquid phase, allowing the brazing to be carried out. The Si content is 8.0 to 13.0%. Since the first brazing filler metal contains Cu as an essential element, the metal has a lower liquid phase ratio. Thus, when a large amount of Cu is left after the brazing, the pitting potential on the surface is made more noble, causing the intermediate layer material to lose its sacrificial protection effect. As a consequence of this, when the Si content is less than 8.0%, corrosion resistance is not obtained to a sufficient extent. When the Si content exceeds 13.0%, an excessive amount of Si is diffused to a counterpart member, such as a fin, causing the counterpart member to melt, if the first brazing filler metal is used for a tube, for example. The Si content is preferably 8.5 to 12.0%.

Fe:

Since Fe tends to form an Al—Fe based or Al—Fe—Si based intermetallic compound, or an Al—Fe—Mn based or Al—Fe—Mn—Si based intermetallic compound when Mn is simultaneously contained, Fe may reduce the amount of Si effective in brazing to deteriorate brazability. The Fe content is 0.05 to 1.20%. When the Fe content is less than 0.05%, an ingot of high-purity aluminum needs to be used, leading to higher cost. When the Fe content exceeds 1.20%, the amount of Si effective in brazing is reduced, resulting in insufficient brazing. The Fe content is preferably 0.10 to 1.00%.

Cu:

Cu becomes concentrated in a joint portion when the material is coagulated during the brazing, making the pitting potential of the joint portion more noble. As described above, the intermediate layer material made of an Al—Zn based alloy will suffer preferential corrosion of the joint portion because Zn is concentrated on the joint portion to make the pitting potential less noble. This problem is canceled out by Cu becoming concentrated on the joint portion to make the pitting potential more noble, thereby preventing the preferential corrosion. The Cu content is 0.05 to 0.50%. When the Cu content is less than 0.05%, the effect is not sufficient. When the Cu content exceeds 0.50%, the pitting potential is made more noble to lose the sacrificial protection effect provided by Zn. The Cu content is preferably 0.10 to 0.50%.

Zn:

Zn may be contained because Zn can make the pitting potential less noble, and can improve corrosion resistance with the sacrificial protection effect by producing a potential difference relative to the core material. The Zn content is 0.5 to 8.0%. When the Zn content is less than 0.5%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Mn:

Mn may be contained because Mn improves the strength of the first brazing filler metal and corrosion resistance. The Mn content is 0.05 to 2.00%. When the Mn content is less than 0.05%, the effect is not obtained to a sufficient extent. When the Mn content exceeds 2.00%, giant intermetallic compounds are more likely to be formed during casting, resulting in deteriorated plasticity. The Mn content is preferably 0.05 to 1.80%.

Ti:

Ti may be contained because Ti improves the strength of the first brazing filler metal through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength of the first brazing filler metal through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the first brazing filler metal through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the first brazing filler metal through solid solution strengthening and also improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

Na and Sr:

Na and Sr each exert the effect of making Si particles in the first brazing filler metal finer. Each of the Na content and the Sr content is 0.001 to 0.050%. When the Na content or Sr content is less than 0.001%, the effect is not obtained to a sufficient extent. When the Na content or Sr content exceeds 0.050%, a thicker oxide film is created, resulting in deteriorated brazability. The Na content and Sr content each are preferably 0.003 to 0.020%.

At least one of these elements: Zn, Mn, Ti, Zr, Cr, V, Na, and Sr may be added to the first brazing filler metal as may be necessary.

3. Intermediate Layer Material

An aluminum alloy used for the intermediate layer material contains Zn: 0.5 to 8.0%, Si: 0.05 to 1.50%, Fe: 0.05 to 2.00%, Mn: 0.05 to 0.50 mass % as essential elements, with the balance consisting of Al and inevitable impurities.

The intermediate layer material may further contain, as selective added element(s), at least one selected from Ni: 0.05 to 2.00%, Ti: 0.05 to 0.30%, Zr: 0.05 to 0.30%, Cr: 0.05 to 0.30%, and V: 0.05 to 0.30%. In addition to the above-mentioned essential elements and selective added elements, the intermediate layer material may contain inevitable impurities of 0.05% or less for each impurity and 0.15% in total. The following describes the individual components.

Zn:

Zn can make the pitting potential less noble, and can improve corrosion resistance with the sacrificial protection effect by producing a potential difference relative to the core material. The Zn content is 0.5 to 8.0%. When the Zn content is less than 0.5%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Si:

Si forms an Al—Fe—Si based or Al—Fe—Mn—Si based intermetallic compound with Fe and Mn to improve the strength of the intermediate layer material through dispersion strengthening, or to form a solid solution in the aluminum matrix to improve the strength through solid solution strengthening. The Si content is 0.05 to 1.50%. When the Si content is less than 0.05%, an ingot of high-purity aluminum needs to be used, leading to higher cost. When the Si content exceeds 1.50%, the intermediate layer material has a lower melting point and is more likely to melt. The Si content is preferably 0.10 to 1.20%.

Fe:

Fe forms an Al—Fe—Si or Al—Fe—Mn—Si based intermetallic compound with Si and Mn to improve the strength of the intermediate layer material through dispersion strengthening. The Fe content is 0.05 to 2.00%. When the Fe content is less than 0.05%, an ingot of high-purity aluminum needs to be used, leading to higher cost. When the Fe content exceeds 2.00%, giant intermetallic compounds are more likely to be formed during casting, resulting in deteriorated plasticity. The Fe content is preferably 0.10 to 1.50%.

Mn:

Mn forms an Al—Mn based intermetallic compound. This intermetallic compound makes recrystallized grains of the intermediate layer material coarser during brazing, improving flowability of the first brazing filler metal. As described above, the amount of the first brazing filler metal remaining after brazing should be reduced from the viewpoint of corrosion resistance. Thus, addition of Mn contributes to improving corrosion resistance. The Mn content is 0.05 to 0.50%. When the Mn content is less than 0.05%, the effect is not obtained to a sufficient extent. When the Mn content exceeds 0.50%, the amount of Mn in a solid solution is increased, which makes the potential of the intermediate layer material more noble to lose the sacrificial protection effect. The Mn content is preferably 0.15 to 0.45%.

Ni:

Ni forms an Al—Ni based intermetallic compound, or an Al—Fe—Ni based intermetallic compound with Fe. These intermetallic compounds serve as a cathode site for corrosion because their corrosion potentials are much more noble than that of the aluminum matrix. Hence, when these intermetallic compounds are dispersed in the intermediate layer material, starting points of corrosion are also dispersed. As a result, corrosion in the depth direction is inhibited, which means corrosion resistance is improved, and thus Ni may be contained. The Ni content is 0.05 to 2.00%. When the Ni content is less than 0.05%, the effect is not obtained to a sufficient extent. When the Ni content exceeds 2.00%, giant intermetallic compounds are more likely to be formed during casting, resulting in deteriorated plasticity. The Ni content is preferably 0.10 to 1.50%.

Ti:

Ti may be contained because Ti improves the strength of the intermediate layer material through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.05 to 0.20%.

Zr:

Zr may be contained because Zr improves the strength of the intermediate layer material through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the intermediate layer material through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the intermediate layer material through solid solution strengthening and also improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.05 to 0.20%.

At least one of these elements: Ni, Ti, Zr, Cr, and V may be added to the intermediate layer material as may be necessary.

4. Core Material

An aluminum alloy used for the core material contains Si: 0.05 to 1.50%, Fe: 0.05 to 2.00%, and Mn: 0.5 to 2.0% as essential elements, with the balance consisting of Al and inevitable impurities.

The core material may further contain, as selective added element(s), at least one selected from Mg: 0.05 to 0.50%, Cu: 0.05 to 1.50%, Ti: 0.05 to 0.30%, Zr: 0.05 to 0.30%, Cr: 0.05 to 0.30%, and V: 0.05 to 0.30%.

In addition to the above-mentioned essential elements and selective added elements, the core material may contain inevitable impurities of 0.05% or less for each impurity and 0.15% in total.

As an aluminum alloy used for the core material of the present disclosure, Al—Mn based alloys represented by JIS 3000 series alloys, such as JIS 3003 alloy, are suitably used. The following describes the individual components in detail.

Si:

Si forms an Al—Mn—Si based or Al—Fe—Mn—Si based intermetallic compound with Fe and Mn to improve the strength of the core material through dispersion strengthening, or to form a solid solution in the aluminum matrix to improve the strength through solid solution strengthening. The Si content is 0.05 to 1.50%. When the Si content is less than 0.05%, an ingot of high-purity aluminum needs to be used, leading to higher cost. When the Si content exceeds 1.50%, the core material has a lower melting point and is more likely to melt. The Si content is preferably 0.10 to 1.20%.

Fe:

Fe forms an Al—Mn—Si based or Al—Fe—Mn—Si based intermetallic compound with Si and Mn to improve the strength of the core material through dispersion strengthening. The Fe content is 0.05 to 2.00%. When the Fe content is less than 0.05%, an ingot of high-purity aluminum needs to be used, leading to higher cost. When the Fe content exceeds 2.00%, giant intermetallic compounds are more likely to be formed during casting, resulting in deteriorated plasticity. The Fe content is preferably 0.10 to 1.50%.

Mn:

Mn forms an Al—Mn—Si based or Al—Fe—Mn—Si based intermetallic compound with Si and Fe to improve the strength of the core material through dispersion strengthening, or to form a solid solution in the aluminum matrix to improve the strength through solid solution strengthening. The Mn content is 0.5 to 2.0%. When the Mn content is less than 0.5%, the effect is insufficient. When the Mn content exceeds 2.0%, giant intermetallic compounds are more likely to be formed during casting, resulting in deteriorated plasticity. The Mn content is preferably 0.8 to 1.8%.

Mg:

Mg may be contained because Mg improves the strength of the core material through precipitation of $Mg_2Si$. The Mg content is 0.05 to 0.50%. When the Mg content is less than 0.05%, the effect is not exerted sufficiently. When the Mg content exceeds 0.50%, brazing is difficult to carry out. The Mg content is preferably 0.10 to 0.40%.

Cu:

Cu may be contained because Cu improves the strength of the core material through solid solution strengthening. The Cu content is 0.05 to 1.50%. When the Cu content is less than 0.05%, the effect is not exerted sufficiently. When the Cu content exceeds 1.50%, the aluminum alloy is more likely to crack during casting. The Cu content is preferably 0.30 to 1.00%.

Ti:

Ti may be contained because Ti improves the strength of the core material through solid solution strengthening. The Ti content is 0.05 to 0.30%. When the Ti content is less than 0.05%, the effect is not exerted sufficiently. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength of the core material through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained.

When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the core material through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the core material through solid solution strengthening and improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

At least one of these elements: Mg, Cu, Ti, Zr, Cr, and V may be added to the core material as may be necessary.

5. Second Brazing Filler Metal

An aluminum alloy used for the second brazing filler metal contains Si: 2.5 to 13.0% and Fe: 0.05 to 1.20 mass % as essential elements, with the balance consisting of Al and inevitable impurities.

The second brazing filler metal may further contain, as first selective added element(s), at least one selected from Zn: 0.5 to 8.0%, Cu: 0.05 to 1.50%, Mn: 0.05 to 2.00%, Ti: 0.05 to 0.30%, Zr: 0.05 to 0.30%, Cr: 0.05 to 0.30%, and V: 0.05 to 0.30%. The second brazing filler metal may further contain, as second selective added element(s), at least one selected from Na: 0.001 to 0.050% and Sr: 0.001 to 0.050%. In addition to the above-mentioned essential elements and first and second selective added elements, the second brazing filler metal may contain inevitable impurities of 0.05% or less for each impurity and 0.15% in total. The following describes the individual components.

Si:

Addition of Si lowers the melting point of the second brazing filler metal to generate a liquid phase, allowing the brazing to be carried out. The Si content is 2.5 to 13.0%. When the Si content is less than 2.5%, the liquid phase is generated only to a small extent and the brazing function is difficult to perform. When the Si content exceeds 13.0%, an excessive amount of Si is diffused to a counterpart member, such as a fin, causing the counterpart member to melt, if the second brazing filler metal is used for a tube, for example. The Si content is preferably 3.5 to 12.0%.

Fe:

Since Fe tends to form an Al—Fe based or Al—Fe—Si based intermetallic compound, Fe may reduce the amount of Si effective in brazing to deteriorate brazability. The Fe content is 0.05 to 1.20%. When the Fe content is less than 0.05%, an ingot of high-purity aluminum needs to be used, leading to higher cost. When the Fe content exceeds 1.20%, the amount of Si effective in brazing is reduced, resulting in insufficient brazing. The Fe content is preferably 0.10 to 0.50%.

Zn:

Zn may be contained because Zn can make the pitting potential less noble, and can improve corrosion resistance with the sacrificial protection effect by producing a potential difference relative to the core material. The Zn content is 0.5 to 8.0%. When the Zn content is less than 0.5%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Cu:

Cu may be contained because Cu improves the strength of the second brazing filler metal through solid solution strengthening. The Cu content is 0.05 to 1.50%. When the Cu content is less than 0.05%, the effect is not exerted sufficiently. When the Cu content exceeds 1.50%, the aluminum alloy is more likely to crack during casting. The Cu content is preferably 0.30 to 1.00%.

Mn:

Mn may be contained because Mn improves the strength of the second brazing filler metal and corrosion resistance. The Mn content is 0.05 to 2.00%. When the Mn content is less than 0.05%, the effect is not obtained to a sufficient extent. When the Mn content exceeds 2.00%, giant intermetallic compounds are more likely to be formed during casting, resulting in deteriorated plasticity. The Mn content is preferably 0.05 to 1.80%.

Ti:

Ti may be contained because Ti improves the strength of the second brazing filler metal through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength of the second brazing filler metal through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the second brazing filler metal through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the second brazing filler metal through solid solution strengthening and also improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

Na and Sr:

Na and Sr each exert the effect of making Si particles in the second brazing filler metal finer. Each of the Na content and the Sr content is 0.001 to 0.050%. When the Na content or Sr content is less than 0.001%, the effect is not obtained to a sufficient extent. When the Na content or Sr content exceeds 0.050%, a thicker oxide film is created, resulting in deteriorated brazability. The Na content and Sr content each are preferably 0.003 to 0.020%.

At least one of these elements: Zn, Cu, Mn, Ti, Zr, Cr, V, Na, and Sr may be added to the second brazing filler metal as may be necessary.

6. Sacrificial Anode Material

An aluminum alloy used for the sacrificial anode material contains Zn: 0.5 to 8.0%, Si: 0.05 to 1.50%, and Fe: 0.05 to 2.00% as essential elements, with the balance consisting of Al and inevitable impurities.

In addition to these essential elements, the sacrificial anode material may further contain, as selective added element(s), at least one selected from Ni: 0.05 to 2.00%, Mn: 0.05 to 2.00%, Ti: 0.05 to 0.30%, Zr: 0.05 to 0.30%, Cr: 0.05 to 0.30 mass %, and V: 0.05 to 0.30 mass %. In addition to the above-mentioned essential elements and selective added elements, the sacrificial anode material may contain inevitable impurities of 0.05% or less for each impurity and 0.15% in total. The following describes the individual components.

Zn:

Zn can make the pitting potential less noble, and can improve corrosion resistance with the sacrificial protection effect by producing a potential difference relative to the core material. The Zn content is 0.5 to 8.0%. When the Zn content is less than 0.50%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Si:

Si forms an Al—Fe—Si based intermetallic compound with Fe, or an Al—Fe—Mn—Si based intermetallic compound with Fe and Mn when Mn is simultaneously contained, to improve the strength of the sacrificial anode material through dispersion strengthening, or to form a solid solution in the aluminum matrix to improve the strength through solid solution strengthening. On the other hand, Si makes the potential of the sacrificial anode layer more noble, inhibiting the sacrificial protection effect to reduce the corrosion resistance. The Si content is 0.05 to 1.50%. When the Si content is less than 0.05%, an ingot of high-purity aluminum needs to be used, leading to higher cost. When the Si content exceeds 1.50%, Si makes the pitting potential of the sacrificial anode material more noble, losing the sacrificial protection effect to reduce the corrosion resistance. The Si content is preferably 0.10 to 1.20%.

Fe:

Fe forms an Al—Fe—Si based intermetallic compound with Si, or an Al—Fe—Mn—Si based intermetallic compound with Si and Mn when Mn is simultaneously contained, to improve the strength of the sacrificial anode material through dispersion strengthening. The Fe content is 0.05 to 2.00%. When the Fe content is less than 0.05%, an ingot of high-purity aluminum needs to be used, leading to higher cost. When the Fe content exceeds 2.00%, giant intermetallic compounds are more likely to be formed during casting, resulting in deteriorated plasticity. The Fe content is preferably 0.10 to 1.50%.

Ni:

Ni forms an Al—Ni based intermetallic compound, or an Al—Fe—Ni based intermetallic compound with Fe. These intermetallic compounds serve as a cathode site for corrosion because their corrosion potentials are much more noble than that of the aluminum matrix. Hence, when these intermetallic compounds are dispersed in the sacrificial anode material, starting points of corrosion are also dispersed. As a result, corrosion in the depth direction is inhibited, which means corrosion resistance is improved, and thus Ni may be contained. The Ni content is 0.05 to 2.00%. When the Ni content is less than 0.05%, the effect is not obtained to a sufficient extent. When the Ni content exceeds 2.00%, giant intermetallic compounds are more likely to be formed during casting, resulting in deteriorated plasticity. The Ni content is preferably 0.10 to 1.50%.

Mn:

Mn may be contained because Mn improves the strength of the sacrificial anode material and corrosion resistance. The Mn content is 0.05 to 2.00%. When the Mn content is less than 0.05%, the effect is not obtained to a sufficient extent. When the Mn content exceeds 2.00%, giant intermetallic compounds are more likely to be formed during casting, resulting in deteriorated plasticity. The Mn content is preferably 0.05 to 1.80%.

Ti:

Ti may be contained because Ti improves the strength of the sacrificial anode material through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.05 to 0.20%.

Zr:

Zr may be contained because Zr improves the strength of the sacrificial anode material through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the sacrificial anode material through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the sacrificial anode material through solid solution strengthening and also improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.05 to 0.20%.

At least one of these elements: Ni, Mn, Ti, Zr, Cr, and V may be added to the sacrificial anode material as may be necessary.

7. Structure of Intermediate Layer Material

Limitations are imposed on the intermediate layer material in the aluminum alloy clad material according to the present disclosure as follows. The existence density of Al—Mn based intermetallic compounds having a circle-equivalent diameter between 0.1 and 1.0 µm inclusive before brazing heating is limited to at least $1.0 \times 10^5$ pieces/mm$^2$, while the existence density of Al—Mn based intermetallic compounds having a circle-equivalent diameter between 0.1 and 1.0 µm inclusive after the brazing heating is limited to at least $1.0 \times 10^4$ pieces/mm$^2$. These limitations are intended to improve corrosion resistance on the surface of the intermediate layer material side after the brazing heating. The existence density, as used herein, refers to a number density per unit area, as observed on a cross section taken in an arbitrary direction of the intermediate layer material. Reasons for the limitations are described below.

The intermediate layer material is clad for the purpose of providing the sacrificial protection effect to prevent pitting corrosion that may be caused in, for example, a tube, by generating preferential corrosion in the intermediate layer material to facilitate planar corrosion and prevent corrosion in the thickness direction. However, as described above, if the first brazing filler metal remains in a large amount after brazing, Cu contained in the first brazing filler metal makes the pitting potential more noble to disable the sacrificial protection feature, with the result that corrosion perforation occurs in an early stage. After conducting intensive studies, the inventors have found that flowability of the first brazing filler metal can be improved to prevent corrosion perforation by distributing Al—Mn based intermetallic compounds having an appropriate size (circle-equivalent diameter) and density in the intermediate layer material after brazing.

As described above, Al—Mn based intermetallic compounds in the intermediate layer material have the effects of preventing recrystallization during brazing, making crystal grains of the intermediate layer material coarse during brazing, and improving flowability of the first brazing filler metal. However, small-sized Al—Mn based intermetallic compounds do not have such effects because they are formed into a solid solution in the matrix and disappear during brazing.

Specifically, Al—Mn based intermetallic compounds having a circle-equivalent diameter between 0.1 and 1.0 µm inclusive before brazing are prevented from dissolving into the matrix during the brazing and thus have the effect of improving the flowability. Al—Mn based intermetallic compounds having a circle-equivalent diameter of less than 0.1 µm before brazing dissolve into the matrix or become smaller during the brazing, and thus do not have the effect of improving the flowability. On the other hand, Al—Mn based intermetallic compounds having a circle-equivalent diameter exceeding 1.0 µm before brazing form an origin of recrystallization during the brazing to make crystal grains of the intermediate layer material finer, deteriorating the flowability. To exert the effect of improving the flowability, Al—Mn based intermetallic compounds existing before the brazing preferably have a circle-equivalent diameter between 0.15 and 0.8 µm inclusive.

In addition, if Al—Mn based intermetallic compounds having a circle-equivalent diameter between 0.1 and 1.0 µm inclusive are present before the brazing in an existence density of at least $1.0 \times 10^5$ pieces/mm$^2$, the effect of improving the flowability is fully exerted, and excellent corrosion resistance is obtained after the brazing. If Al—Mn based intermetallic compounds having a circle-equivalent diameter between 0.1 and 1.0 µm inclusive are present before the brazing in an existence density of less than $1.0 \times 10^5$ pieces/mm$^2$, the effect of improving the flowability is not fully exerted, and excellent corrosion resistance is not obtained after the brazing. The existence density of Al—Mn based intermetallic compounds having a circle-equivalent diameter between 0.1 and 1.0 µm inclusive before brazing is preferably at least $2.0 \times 10^5$ pieces/mm$^2$. From the viewpoint of corrosion resistance, no upper limit is imposed on the existence density of Al—Mn based intermetallic compounds having a circle-equivalent diameter between 0.1 and 1.0 µm inclusive before brazing. However, the intermetallic compounds can hardly be present with an existence density exceeding $5.0 \times 10^6$ pieces/mm$^2$, and thus the present disclosure sets an upper limit of $5.0 \times 10^6$ pieces/mm$^2$ to the existence density.

When a clad material that includes the intermediate layer material in which Al—Mn based intermetallic compounds have a circle-equivalent diameter between 0.1 and 1.0 µm inclusive and an existence density of at least $1.0 \times 10^5$ pieces/mm$^2$ before brazing is subjected to brazing heating, the Al—Mn based intermetallic compounds having a circle-equivalent diameter between 0.1 and 1.0 µm inclusive will be present in an existence density of at least $1.0 \times 10^4$ pieces/mm$^2$. This is because some Al—Mn based intermetallic compounds having a circle-equivalent diameter closer to 0.1 µm among those having a circle-equivalent diameter between 0.1 and 1.0 µm dissolve in the matrix. The existence density of Al—Mn based intermetallic compounds having a circle-equivalent diameter between 0.1 and 1.0 µm inclusive after brazing is preferably at least $2.0 \times 10^4$ pieces/mm$^2$. From the viewpoint of corrosion resistance, no upper limit is imposed on the existence density of Al—Mn based intermetallic compounds having a circle-equivalent diameter between 0.1 and 1.0 µm inclusive after brazing. However, the intermetallic compounds can hardly be present with an existence density exceeding $5.0 \times 10^6$ pieces/mm$^2$, and thus the present disclosure sets an upper limit of $5.0 \times 10^6$ pieces/mm$^2$ to the existence density.

8. Method for Producing Aluminum Alloy Clad Material 8-1. Production Steps

A method for producing the aluminum alloy clad material according to the first embodiment of the present disclosure includes: the step of casting aluminum alloys for the core material, the intermediate layer material, and the first brazing filler metal, respectively; the step of hot rolling ingots of the intermediate layer material and the first brazing filler metal to a predetermined thickness; the cladding step of cladding the hot-rolled intermediate layer material on one surface of the core material ingot, and further cladding the hot-rolled first brazing filler metal on the intermediate layer material; the hot clad rolling step of hot rolling the clad material; the cold rolling step of cold rolling the clad material that has undergone the hot rolling; and the annealing step of annealing at least once the clad material either or both of during the cold rolling step and after the cold rolling step. A method for producing the aluminum alloy clad material according to the second embodiment of the present disclosure includes, in addition to the first embodiment, cladding the hot-rolled second brazing filler metal on the other surface of the core material ingot during the cladding step. A method for producing the aluminum alloy clad material according to the third embodiment of the present disclosure includes, in addition to the first embodiment, cladding the hot-rolled sacrificial anode material on the other surface of the core material ingot during the cladding step.

The aluminum alloy clad material of the present disclosure achieves excellent corrosion resistance owing to control of the structure of the intermediate layer material. After conducting intensive studies, the inventors have found that the most influential production step in controlling the structure is the step of hot rolling the intermediate layer material that has been cast. The following describes how the step of hot rolling the intermediate layer material is controlled.

8-2. Step of Hot Rolling Intermediate Layer Material

The method for producing the aluminum alloy clad material according to the present disclosure is distinctive in the step of hot rolling the intermediate layer material to a predetermined sheet thickness for the purpose of achieving a desired clad ratio, after the step of casting the intermediate layer material. The hot rolling step includes a stage of heating an ingot, a subsequent stage of holding the ingot, and a stage of hot rolling the ingot that has been heated and held. The rate of temperature rise up to 400° C. in the heating stage is set to 30° C./h or higher, and the rate of temperature rise from 400° C. up to the holding temperature in the holding stage is set to 60° C./h or lower. For the holding stage, the holding temperature is set to 450° C. or higher and the holding time is set to one hour or longer. For the hot rolling stage, the time period during which the rolled material is at a temperature of 400° C. or higher is limited to 5 minutes or longer. Conditions for the step of hot rolling the intermediate layer material are defined as above. As a result, the aluminum alloy clad material according to the present disclosure provides, before and after brazing, the distribution of Al—Mn based intermetallic compounds as defined according to the present disclosure, thereby achieving excellent corrosion resistance after the brazing. Reasons for this achievement are described below.

As described above, a large amount of Mn contained in the intermediate layer material lessen the sacrificial protection effect. Thus, the Mn content needs to be narrowed to a range of 0.05 to 0.50%. At the same time, as described above, in order to minimize the first brazing filler metal remaining after brazing, Al—Mn based intermetallic compounds having a certain size have to be generated in the intermediate layer material. After conducting intensive studies, the inventors have found that an appropriate distribution of Al—Mn based intermetallic compounds can be obtained by precisely controlling temperatures at which the intermediate layer material is rolled to a predetermined thickness during the heating and hot rolling steps.

During the step of casting the intermediate layer material, a large amount of Mn forms a solid solution in the matrix of the ingot. Such large amount of Mn forming a solid solution in the matrix is precipitated as a lot of Al—Mn based intermetallic compounds during the heating stage prior to the hot rolling stage in the hot rolling step. These Al—Mn based intermetallic compounds mostly determine the structure of the intermediate layer material in the aluminum alloy clad material before brazing. As described above, in order that Al—Mn based intermetallic compounds remain in a size effective to provide corrosion resistance after brazing, the Al—Mn based intermetallic compounds need to have a circle-equivalent diameter between 0.1 and 1.0 μm inclusive before the brazing. During the heating stage prior to the hot rolling stage in the hot rolling step, relatively small precipitates of Al—Mn intermetallic compounds are generated until the ingot of the intermediate layer material is heated to 400° C., while relatively large precipitates of Al—Mn intermetallic compounds are generated after the ingot is heated to 400° C.

If the rate of temperature rise up to 400° C. is less than 30° C./h during the heating stage prior to the rolling stage in the hot rolling step, a large number of precipitates of relatively small Al—Mn based intermetallic compounds are generated. As a result, the desired precipitate distribution of Al—Mn based intermetallic compounds cannot be obtained. If the rate of temperature rise from 400° C. up to the holding temperature for the holding stage exceeds 60° C./h, a small number of precipitates of relatively large Al—Mn based intermetallic compounds are generated. As a result, the desired precipitate distribution of Al—Mn based intermetallic compounds cannot be obtained. If the holding temperature is lower than 450° C. during the holding stage, a small number of precipitates of relatively large Al—Mn based intermetallic compounds are generated. As a result, the desired precipitate distribution of Al—Mn based intermetallic compounds cannot be obtained. If the holding time is shorter than one hour, a small number of participates of relatively large Al—Mn based intermetallic compounds are generated. As a result, the desired precipitate distribution of Al—Mn based intermetallic compounds cannot be obtained.

The rate of temperature rise up to 400° C. is preferably 40° C./h or higher, while the rate of temperature rise from 400° C. up to the holding temperature for the holding stage is preferably 50° C./h or lower. The holding temperature for the holding stage is preferably 460° C. or higher, and the holding time is preferably 2 hours or longer.

From the viewpoint of corrosion resistance, no specific upper limit is imposed on the aforementioned rate of temperature rise up to 400° C. However, in terms of heat capacity of an ingot, there is difficulty in having a rate of temperature rise higher than 100° C./h. Accordingly, the upper limit of the rate of temperature rise is set to 100° C./h in the present disclosure. From the viewpoint of corrosion resistance, no specific lower limit is imposed on the rate of temperature rise from 400° C. up to the holding temperature for the holding stage. However, a rate of temperature rise lower than 20° C./h involves an extremely long time to raise temperature, significantly impairing cost effectiveness. Accordingly, the lower limit of the rate of temperature rise is set to 20° C./h in the present disclosure. If the holding temperature for the holding stage exceeds 650° C., the intermediate layer material may melt, failing to produce the clad material. Accordingly, the upper limit of the holding temperature is set to 650° C. From the viewpoint of corrosion resistance, no specific upper limit is imposed on the aforementioned holding time. However, a holding time longer than 20 hours significantly impairs cost effectiveness. Accordingly, the upper limit of the holding time is set to 20 hours.

The time required for the hot rolling stage is shorter than the preceding heating and holding stages. However, the strain introduced in this hot rolling stage facilitates precipitation of intermetallic compounds. That is, during the hot rolling stage, precipitates of relatively large Al—Mn based intermetallic compounds are generated in spite of a short rolling time. If the time period during which the intermediate layer material is at 400° C. or higher is shorter than 5 minutes in the hot rolling stage, a small number of precipitates of relatively large Al—Mn based intermetallic compounds are generated. As a result, the desired precipitate distribution of Al—Mn based intermetallic compounds cannot be obtained.

During the hot rolling stage, the time period during which the intermediate layer material is at 400° C. or higher is preferably 7 minutes or longer. From the viewpoint of corrosion resistance, no specific upper limit is imposed on the time period. However, in terms of heat capacity of an ingot, there is difficulty in keeping the ingot at a temperature of 400° C. or higher for more than 30 minutes. Accordingly, the upper limit of the time period is set to 30 minutes in the present disclosure. As long as the intermediate layer material is at a temperature lower than 400° C. during the hot rolling stage, very few precipitates of Al—Mn based intermetallic compounds are generated, and thus the time period need not be controlled.

The above-described steps exert a greater influence on corrosion resistance. The following describes preferable production conditions for the steps other than the step of hot rolling the intermediate layer material.

8-3. Casting Step and Hot Rolling Step

No specific limitation is imposed on conditions for the step of casing the first brazing filler metal, the intermediate layer material, the core material, the second brazing filler metal, and the sacrificial anode material. However, the casting step is usually performed by using a water-cooled semi-continuous casting method. The hot rolling steps of hot rolling the first brazing filler metal, the second brazing filler metal, and the sacrificial anode material to their predetermined thicknesses include a heating stage, a heating and holding stage, and a hot rolling stage. As heating conditions for the heating and holding stage, the material is heated preferably at 400 to 560° C. for 5 to 10 hours in general, and more preferably at 420 to 540° C. for 0.5 to 8 hours. If the temperature is lower than 400° C., the material may crack on its edge during the rolling because of poor plasticity. If the temperature is higher than 560° C., the ingot may melt during the heating. If the heating time is shorter than 0.5 hours, the ingot temperature may not become uniform. If the heating time is longer than 10 hours, cost effectiveness is significantly impaired.

8-4. Homogenizing Treatment Step

The ingot obtained by casting the core material may be subjected to a homogenizing treatment step before the hot clad rolling step. The homogenizing treatment step is carried out preferably at 450 to 620° C. for 1 to 24 hours in general, and more preferably at 480 to 620° C. for 1 to 20 hours. If the temperature is lower than 450° C. or the time is shorter than one hour, the resulting homogenizing effect may be insufficient. If the temperature is higher than 620° C., the core material ingot may melt. If the time is longer than 24 hours, cost effectiveness is significantly impaired.

8-5. Hot Clad Rolling Step

During the hot clad rolling step, the clad material is heated in the heating stage prior to the clad rolling stage. The heating is carried out preferably at 400 to 560° C. for 0.5 to 10 hours in general, and more preferably at 420 to 540° C. for 0.5 to 8 hours. If the temperature is lower than 400° C., the material may crack on its edge during the clad rolling because of poor plasticity. If the temperature is higher than 560° C., the ingot may melt during the heating. If the heating time is shorter than 0.5 hours, the clad material temperature may not become uniform. If the time is longer than 10 hours, cost effectiveness is significantly impaired. The hot clad rolling step may be divided into two steps carried out in series: a rough rolling step with a rolling reduction of 70 to 95% and a finish rolling step with a rolling reduction of 70 to 95%.

8-6. Cold Rolling Step and Annealing Step

The annealing step is carried out at least once during or after the cold rolling step or during and after the cold rolling step for the purpose of improving formability, for example. Specifically, (1) at least one intermediate annealing step is performed during the cold rolling step; (2) a final annealing step is performed once after the cold rolling step; or (3) both steps described in (1) and (2) are performed. During the annealing step, the clad material is held preferably at 200 to 560° C. for 1 to 10 hours. If the temperature is lower than 200° C. and the holding time is shorter than one hour, the aforementioned effect may not be exerted sufficiently. If the temperature is higher than 560° C., the clad material may melt during heating. If the holding time is longer than 10 hours, cost effectiveness is significantly impaired. More preferable annealing conditions include a temperature of 230 to 500° C. and a holding time of 1 to 8 hours. No specific upper limit is imposed on the number of annealing steps. However, the number of annealing steps is preferably set to three so as to avoid a cost increase caused by a larger number of steps.

9. Clad Ratio and Thickness

Each of the first brazing filler metal, the intermediate layer material, the second brazing filler metal, and the sacrificial anode material included in the aluminum alloy clad material of the present disclosure preferably has a clad ratio (single side) of 3 to 25%. When any of these materials has a clad ratio lower than 3%, which means the clad material is too thin, the material may fail to cover the whole core material during the hot clad rolling. When any of these materials has a clad ratio higher than 25%, warpage may occur during the hot clad rolling, failing to produce the clad material. More preferably, each clad ratio is 5 to 20%.

No specific limit is imposed on the thickness of the aluminum alloy clad material according to the present disclosure. However, the clad material having a thickness of 0.15 to 0.6 mm is usually used for, for example, a passage forming component for a heat exchanger. Alternatively, the clad material having a thickness of about 0.6 to 3 mm can be used for a header plate, for example.

EXAMPLES

The present disclosure will now be described in more detail on the basis of Examples of the present disclosure and Comparative Examples, but the present disclosure is not limited to the Examples.

First brazing filler metal alloys, intermediate layer material alloys, core material alloys, second brazing filler metal alloys, and sacrificial anode material alloys, whose alloy compositions are listed in Table 1, Table 2, Table 3, Table 4, and Table 5, respectively, were each cast into an ingot through DC casting, and finished by facing both surfaces. Each ingot after the facing had a thickness of 400 mm. For the first brazing filler metals, the second brazing filler metals, and the sacrificial anode materials, clad ratios satisfying the desired final thickness were calculated, and, to obtain the required combined thickness based on the clad ratios, these materials were each subjected to a heating stage at 480° C. for 3 hours and then to a hot rolling stage until reaching a predetermined thickness. Table 6 shows conditions used for the step of hot rolling the intermediate layer material. The second brazing filler metals and the sacrificial anode materials were each hot rolled by using the conditions listed in F1 in Table 6.

TABLE 1

|  | Alloy Symbol | Alloy Composition (mass %) | | | | | | | | | | | |
|---|---|---|---|---|---|---|---|---|---|---|---|---|---|
|  |  | Si | Fe | Cu | Mn | Zn | Ti | Zr | Cr | V | Na | Sr | Al |
| Example of the Present Disclosure | A1 | 10.0 | 0.20 | 0.30 | — | — | — | — | — | — | — | — | Balance |
|  | A2 | 8.0 | 0.20 | 0.30 | — | — | 0.05 | — | — | — | 0.001 | — | Balance |
|  | A3 | 13.0 | 0.20 | 0.30 | — | — | — | 0.05 | — | — | — | 0.001 | Balance |
|  | A4 | 10.0 | 0.05 | 0.30 | — | — | — | — | 0.05 | — | 0.050 | — | Balance |
|  | A5 | 10.0 | 1.20 | 0.30 | — | — | — | — | — | 0.05 | — | 0.050 | Balance |
|  | A6 | 10.0 | 0.20 | 0.05 | — | — | 0.30 | 0.30 | 0.30 | 0.30 | — | — | Balance |
|  | A7 | 10.0 | 0.20 | 0.50 | — | — | — | — | — | — | — | — | Balance |
|  | A8 | 10.0 | 0.20 | 0.30 | 0.05 | — | — | — | — | — | — | — | Balance |
|  | A9 | 10.0 | 0.20 | 0.30 | 2.00 | — | — | — | — | — | — | — | Balance |
|  | A10 | 10.0 | 0.20 | 0.30 | — | 0.5 | — | — | — | — | — | — | Balance |
|  | A11 | 10.0 | 0.20 | 0.30 | — | 8.0 | — | — | — | — | — | — | Balance |
|  | A12 | 10.0 | 0.20 | 0.30 | — | 0.5 | — | — | — | — | — | — | Balance |
| Comparative Example | A13 | 7.5 | 0.20 | 0.30 | — | — | — | — | — | — | — | — | Balance |
|  | A14 | 14.0 | 0.20 | 0.30 | — | — | — | — | — | — | — | — | Balance |
|  | A15 | 10.0 | 1.40 | 0.30 | — | — | — | — | — | — | — | — | Balance |
|  | A16 | 10.0 | 0.20 | 0.04 | — | — | — | — | — | — | — | — | Balance |
|  | A17 | 10.0 | 0.20 | 0.60 | — | — | — | — | — | — | — | — | Balance |
|  | A18 | 10.0 | 0.20 | 0.30 | 2.20 | — | — | — | — | — | — | — | Balance |
|  | A19 | 10.0 | 0.20 | 0.30 | — | — | 0.40 | 0.40 | 0.40 | 0.40 | — | — | Balance |
|  | A20 | 10.0 | 0.20 | 0.30 | — | — | — | — | — | — | 0.060 | — | Balance |
|  | A21 | 10.0 | 0.20 | 0.30 | — | — | — | — | — | — | — | 0.060 | Balance |
|  | A22 | 10.0 | 0.20 | 0.30 | — | 0.4 | — | — | — | — | — | — | Balance |
|  | A23 | 10.0 | 0.20 | 0.30 | — | 9.0 | — | — | — | — | — | — | Balance |

TABLE 2

|  | Alloy Symbol | Alloy Composition (mass %) | | | | | | | | | | |
|---|---|---|---|---|---|---|---|---|---|---|---|---|
|  |  | Zn | Si | Fe | Mn | Mg | Ni | Ti | Zr | Cr | V | Al |
| Example of the Present Disclosure | B1 | 4.0 | 0.20 | 0.20 | 0.30 | — | — | — | — | — | — | Balance |
|  | B2 | 0.5 | 0.05 | 0.05 | 0.30 | — | — | 0.05 | — | — | — | Balance |
|  | B3 | 8.0 | 0.20 | 0.20 | 0.30 | — | — | 0.30 | 0.30 | 0.30 | 0.30 | Balance |
|  | B4 | 4.0 | 1.50 | 0.20 | 0.30 | — | — | — | 0.05 | — | — | Balance |
|  | B5 | 4.0 | 0.20 | 2.00 | 0.30 | — | — | — | — | 0.05 | — | Balance |
|  | B6 | 4.0 | 0.20 | 0.20 | 0.05 | — | — | — | — | — | 0.05 | Balance |
|  | B7 | 4.0 | 0.20 | 0.20 | 0.50 | — | — | — | — | — | — | Balance |
|  | B8 | 4.0 | 0.20 | 0.20 | 0.30 | — | 0.05 | — | — | — | — | Balance |
|  | B9 | 4.0 | 0.20 | 0.20 | 0.30 | — | 2.00 | — | — | — | — | Balance |
| Comparative Example | B10 | 4.0 | 1.60 | 0.20 | 0.30 | — | — | — | — | — | — | Balance |
|  | B11 | 4.0 | 0.20 | 2.20 | 0.30 | — | — | — | — | — | — | Balance |
|  | B12 | 4.0 | 0.20 | 0.20 | 0.30 | — | — | 0.40 | 0.40 | 0.40 | 0.40 | Balance |
|  | B13 | 0.4 | 0.20 | 0.20 | 0.30 | — | — | — | — | — | — | Balance |
|  | B14 | 9.0 | 0.20 | 0.20 | 0.30 | — | — | — | — | — | — | Balance |
|  | B15 | 4.0 | 0.20 | 0.20 | 0.30 | — | 2.20 | — | — | — | — | Balance |
|  | B16 | 4.0 | 0.20 | 0.20 | 0.04 | — | — | — | — | — | — | Balance |
|  | B17 | 4.0 | 0.20 | 0.20 | 0.60 | — | — | — | — | — | — | Balance |

TABLE 3

|  | Alloy Symbol | Alloy Composition (mass %) | | | | | | | | | |
|---|---|---|---|---|---|---|---|---|---|---|---|
|  |  | Si | Fe | Cu | Mn | Mg | Ti | Zr | Cr | V | Al |
| Example of the Present Disclosure | C1 | 0.50 | 0.20 | — | 1.1 | — | — | — | — | — | Balance |
|  | C2 | 0.50 | 0.20 | — | 1.1 | 0.50 | 0.05 | — | — | — | Balance |
|  | C3 | 0.50 | 0.20 | — | 1.5 | 0.05 | — | 0.05 | — | — | Balance |
|  | C4 | 0.05 | 2.00 | — | 1.1 | — | — | — | 0.05 | — | Balance |
|  | C5 | 1.50 | 0.05 | 0.05 | 0.5 | — | — | — | — | 0.05 | Balance |
|  | C6 | 0.50 | 0.20 | — | 2.0 | — | 0.30 | 0.30 | 0.30 | 0.30 | Balance |
|  | C7 | 1.20 | 0.20 | 0.05 | 1.1 | — | — | — | — | — | Balance |
|  | C8 | 0.50 | 0.20 | 1.50 | 1.1 | — | — | — | — | — | Balance |
| Comparative Example | C9 | 1.60 | 0.20 | — | 1.1 | — | — | — | — | — | Balance |
|  | C10 | 0.50 | 0.20 | — | 1.1 | 0.60 | — | 0.15 | — | — | Balance |
|  | C11 | 0.50 | 2.20 | — | 1.5 | — | 0.15 | 0.15 | — | — | Balance |
|  | C12 | 0.50 | 0.20 | — | 1.5 | — | 0.40 | 0.40 | 0.40 | 0.40 | Balance |
|  | C13 | 0.50 | 0.20 | — | 2.2 | — | — | — | — | — | Balance |

TABLE 3-continued

| Alloy Symbol | Alloy Composition (mass %) | | | | | | | | | |
|---|---|---|---|---|---|---|---|---|---|---|
| | Si | Fe | Cu | Mn | Mg | Ti | Zr | Cr | V | Al |
| C14 | 0.50 | 0.20 | 1.60 | 1.1 | — | — | — | — | — | Balance |
| C15 | 0.50 | 0.20 | — | 0.4 | — | 0.05 | 0.05 | — | — | Balance |

TABLE 4

| | Alloy Symbol | Alloy Composition (mass %) | | | | | | | | | | | |
|---|---|---|---|---|---|---|---|---|---|---|---|---|---|
| | | Si | Fe | Cu | Mn | Zn | Ti | Zr | Cr | V | Na | Sr | Al |
| Example of the Present Disclosure | D1 | 10.0 | 0.20 | — | — | — | — | — | — | — | — | — | Balance |
| | D2 | 2.5 | 0.20 | — | — | — | 0.05 | — | — | — | 0.001 | — | Balance |
| | D3 | 13.0 | 0.20 | — | — | — | — | 0.05 | — | — | — | 0.001 | Balance |
| | D4 | 10.0 | 0.05 | — | — | — | — | — | 0.05 | — | 0.050 | — | Balance |
| | D5 | 10.0 | 1.20 | — | — | — | — | — | — | 0.05 | — | 0.050 | Balance |
| | D6 | 10.0 | 0.20 | 0.05 | — | — | 0.30 | 0.30 | 0.30 | 0.30 | — | — | Balance |
| | D7 | 10.0 | 0.20 | 1.50 | — | — | — | — | — | — | — | — | Balance |
| | D8 | 10.0 | 0.20 | — | 0.05 | — | — | — | — | — | — | — | Balance |
| | D9 | 10.0 | 0.20 | — | 2.00 | — | — | — | — | — | — | — | Balance |
| | D10 | 10.0 | 0.20 | — | — | 0.5 | — | — | — | — | — | — | Balance |
| | D11 | 10.0 | 0.20 | — | — | 8.0 | — | — | — | — | — | — | Balance |
| Comparative Example | D12 | 2.0 | 0.20 | — | — | — | — | — | — | — | — | — | Balance |
| | D13 | 14.0 | 0.20 | — | — | — | — | — | — | — | — | — | Balance |
| | D14 | 10.0 | 1.40 | — | — | — | — | — | — | — | — | — | Balance |
| | D15 | 10.0 | 0.20 | 1.60 | — | — | — | — | — | — | — | — | Balance |
| | D16 | 10.0 | 0.20 | — | 2.20 | — | — | — | — | — | — | — | Balance |
| | D17 | 10.0 | 0.20 | — | — | — | 0.40 | 0.40 | 0.40 | 0.40 | — | — | Balance |
| | D18 | 10.0 | 0.20 | — | — | — | — | — | — | — | 0.060 | — | Balance |
| | D19 | 10.0 | 0.20 | — | — | — | — | — | — | — | — | 0.060 | Balance |
| | D20 | 10.0 | 0.20 | — | — | 0.4 | — | — | — | — | — | — | Balance |
| | D21 | 10.0 | 0.20 | — | — | 9.0 | — | — | — | — | — | — | Balance |

TABLE 5

| | Alloy Symbol | Alloy Composition (mass %) | | | | | | | | | | |
|---|---|---|---|---|---|---|---|---|---|---|---|---|
| | | Zn | Si | Fe | Mn | Mg | Ni | Ti | Zr | Cr | V | Al |
| Example of the Present Disclosure | E1 | 2.0 | 0.20 | 0.20 | — | — | — | — | — | — | — | Balance |
| | E2 | 0.5 | 0.05 | 0.05 | — | — | — | 0.05 | — | — | — | Balance |
| | E3 | 8.0 | 0.20 | 0.20 | — | — | — | 0.30 | 0.30 | 0.30 | 0.30 | Balance |
| | E4 | 2.0 | 1.50 | 0.20 | — | — | — | — | 0.05 | — | — | Balance |
| | E5 | 2.0 | 0.20 | 2.00 | — | — | — | — | — | 0.05 | — | Balance |
| | E6 | 2.0 | 0.20 | 0.20 | 0.05 | — | — | — | — | — | 0.05 | Balance |
| | E7 | 2.0 | 0.20 | 0.20 | 2.00 | — | — | — | — | — | — | Balance |
| | E8 | 2.0 | 0.20 | 0.20 | — | — | 0.05 | — | — | — | — | Balance |
| | E9 | 2.0 | 0.20 | 0.20 | — | — | 2.00 | — | — | — | — | Balance |
| Comparative Example | E10 | 2.0 | 1.60 | 0.20 | — | — | — | — | — | — | — | Balance |
| | E11 | 2.0 | 0.20 | 2.20 | — | — | — | — | — | — | — | Balance |
| | E12 | 2.0 | 0.20 | 0.20 | — | — | — | 0.40 | 0.40 | 0.40 | 0.40 | Balance |
| | E13 | 0.4 | 0.20 | 0.20 | — | — | — | — | — | — | — | Balance |
| | E14 | 9.0 | 0.20 | 0.20 | — | — | — | — | — | — | — | Balance |
| | E15 | 2.0 | 0.20 | 0.20 | — | — | 2.20 | — | — | — | — | Balance |
| | E16 | 2.0 | 0.20 | 0.20 | 2.20 | — | — | — | — | — | — | Balance |

TABLE 6

| | | Temperature Rise Rate in Heating Stage | | Holding Stage | | Hot Rolling Stage | | Cold Rolling and Subsequent Steps |
|---|---|---|---|---|---|---|---|---|
| | | Up 400° C. (° C./h) | From 400° C. to Holding Temp. (° C./h) | Temp. (° C.) | Time (h) | Start Temp. (° C.) | Duration at 400° C. (min) | |
| Example of the Present Disclosure | F1 | 60 | 40 | 500 | 3 | 490 | 10 | 1 |
| | F2 | 30 | 40 | 500 | 10 | 490 | 10 | 3 |
| | F3 | 100 | 60 | 500 | 3 | 490 | 30 | 2 |
| | F4 | 60 | 20 | 450 | 3 | 440 | 7 | 1 |

TABLE 6-continued

|  |  | Temperature Rise Rate in Heating Stage | | Holding Stage | | Hot Rolling Stage | | Cold Rolling and Subsequent Steps |
|---|---|---|---|---|---|---|---|---|
|  |  | Up 400° C. (° C./h) | From 400° C. to Holding Temp. (° C./h) | Temp. (° C.) | Time (h) | Start Temp. (° C.) | Duration at 400° C. (min) | |
|  | F5 | 60 | 40 | 500 | 1 | 490 | 10 | 3 |
|  | F6 | 60 | 40 | 560 | 3 | 490 | 5 | 2 |
| Comparative | F7 | 25 | 40 | 500 | 3 | 490 | 10 | 1 |
| Example | F8 | 60 | 65 | 500 | 3 | 490 | 10 | 3 |
|  | F9 | 60 | 40 | 440 | 3 | 430 | 6 | 2 |
|  | F10 | 60 | 40 | 500 | 0.5 | 490 | 10 | 1 |
|  | F11 | 60 | 40 | 500 | 3 | 490 | 4 | 3 |
|  | F12 | 60 | 40 | 660 | 3 | — | — | — |

By using these alloys, intermediate layer materials listed in Table 2 were combined with core material alloys listed in Table 3 on one surface of the core material, and first brazing filler metals listed in Table 1 were combined with intermediate layer materials on the surface of the intermediate layer material opposite to the core material. In some examples, second brazing filler metals listed in Table 4 or sacrificial anode materials listed in Table 5 were combined on the other surface of the core material. Tables 7 to 10 show combinations of a first brazing filler metal, a core material, a second brazing filler metal, and a sacrificial anode material, listed by sample. Clad ratios of the first brazing filler metal, the second brazing filler metal, and the sacrificial anode material were each set to 10% (single side). These combined materials were subjected to the hot clad rolling step. That is, each clad material was heated and held at 500° C. for 3 hours in the heating stage, and then to the clad rolling stage, so that a two-layer or three-layer clad material being 3 mm in thickness was produced. Then, a clad material sample being 0.4 mm in final thickness was produced by using the steps in one of the orders as indicated under "Cold Rolling and Subsequent Steps" in Table 6: (1) cold rolling, intermediate annealing, and then final cold rolling; (2) cold rolling, and then final annealing; or (3) cold rolling, intermediate annealing, final cold rolling, and then final annealing. The intermediate annealing and final annealing steps were carried out under the conditions: 370° C. for 2 hours. For each sample, the rolling reduction in the final cold rolling after the intermediate annealing was set to 30%. Combinations of steps are listed in Table 6.

TABLE 7

|  |  | Alloy | | | | | | | Brazability | |
|---|---|---|---|---|---|---|---|---|---|---|
|  |  | 1st | | | 2nd | | | | | |
|  | No. | Brazing Filler Metal | Intermediate Layer Material | Core Material | Brazing Filler Metal | Sacrificial Anode Material | Step | Manufacturability | 1st Brazing Filler Metal | 2nd Brazing Filler Metal |
| Example | 1 | A1 | B1 | C1 | D1 | — | F1 | ○ | ○ | ○ |
| of the | 2 | A2 | B2 | C2 | D2 | — | F1 | ○ | ○ | ○ |
| Present | 3 | A3 | B3 | C3 | D3 | — | F1 | ○ | ○ | ○ |
| Disclosure | 4 | A4 | B4 | C4 | D4 | — | F1 | ○ | ○ | ○ |
|  | 5 | A5 | B5 | C5 | D5 | — | F1 | ○ | ○ | ○ |
|  | 6 | A6 | B6 | C6 | D6 | — | F1 | ○ | ○ | ○ |
|  | 7 | A7 | B7 | C7 | D7 | — | F1 | ○ | ○ | ○ |
|  | 8 | A8 | B8 | C8 | D8 | — | F1 | ○ | ○ | ○ |
|  | 9 | A9 | B9 | C1 | D9 | — | F1 | ○ | ○ | ○ |
|  | 10 | A10 | B1 | C1 | D10 | — | F1 | ○ | ○ | ○ |
|  | 11 | A11 | B1 | C1 | D11 | — | F1 | ○ | ○ | ○ |
|  | 12 | A12 | B1 | C1 | — | E1 | F1 | ○ | ○ | — |
|  | 13 | A1 | B1 | C1 | — | E2 | F1 | ○ | ○ | — |
|  | 14 | A1 | B1 | C1 | — | E3 | F1 | ○ | ○ | — |
|  | 15 | A1 | B1 | C1 | — | E4 | F1 | ○ | ○ | — |
|  | 16 | A1 | B1 | C1 | — | E5 | F1 | ○ | ○ | — |
|  | 17 | A1 | B1 | C1 | — | E6 | F1 | ○ | ○ | — |
|  | 18 | A1 | B1 | C1 | — | E7 | F1 | ○ | ○ | — |
|  | 19 | A1 | B1 | C1 | — | E8 | F1 | ○ | ○ | — |
|  | 20 | A1 | B1 | C1 | — | E9 | F1 | ○ | ○ | — |

TABLE 7-continued

|  | No. | Tensile Strength After Brazing Heating Measurement (MPa) | Evaluation | Existence Density of Al—Mn Intermetallic Compounds having Circle-Equivalent Dia. 0.1-1.0 μm Before Brazing (pcs/mm$^2$) | Existence Density of Al—Mn Intermetallic Compounds having Circle-Equivalent Dia. 0.1-1.0 μm After Brazing (pcs/mm$^2$) | Corrosion Resistance 1st Brazing Filler Metal Flat Portion | Corrosion Resistance 1st Brazing Filler Metal Joint Portion | 2nd Brazing Filler Metal | Sacrificial Anode Material |
|---|---|---|---|---|---|---|---|---|---|
| Example of the Present Disclosure | 1 | 142 | ○ | 5.4 × 10$^5$ | 6.0 × 10$^4$ | ○ | ○ | — | — |
|  | 2 | 179 | ○ | 4.5 × 10$^5$ | 5.0 × 10$^4$ | ○ | ○ | — | — |
|  | 3 | 148 | ○ | 5.1 × 10$^5$ | 5.7 × 10$^4$ | ○ | ○ | — | — |
|  | 4 | 142 | ○ | 7.0 × 10$^5$ | 7.8 × 10$^4$ | ○ | ○ | — | — |
|  | 5 | 160 | ○ | 3.9 × 10$^5$ | 4.3 × 10$^4$ | ○ | ○ | — | — |
|  | 6 | 149 | ○ | 2.1 × 10$^5$ | 2.3 × 10$^4$ | ○ | ○ | — | — |
|  | 7 | 159 | ○ | 9.5 × 10$^5$ | 10.6 × 10$^4$ | ○ | ○ | — | — |
|  | 8 | 188 | ○ | 5.1 × 10$^5$ | 5.7 × 10$^4$ | ○ | ○ | — | — |
|  | 9 | 140 | ○ | 4.8 × 10$^5$ | 5.3 × 10$^4$ | ○ | ○ | — | — |
|  | 10 | 145 | ○ | 5.0 × 10$^5$ | 5.6 × 10$^4$ | ○ | ○ | ○ | — |
|  | 11 | 141 | ○ | 4.9 × 10$^5$ | 5.4 × 10$^4$ | ○ | ○ | ○ | — |
|  | 12 | 138 | ○ | 5.3 × 10$^5$ | 5.9 × 10$^4$ | ○ | ○ | — | ○ |
|  | 13 | 135 | ○ | 5.7 × 10$^5$ | 6.3 × 10$^4$ | ○ | ○ | — | ○ |
|  | 14 | 139 | ○ | 4.6 × 10$^5$ | 5.1 × 10$^4$ | ○ | ○ | — | ○ |
|  | 15 | 140 | ○ | 5.3 × 10$^5$ | 5.9 × 10$^4$ | ○ | ○ | — | ○ |
|  | 16 | 138 | ○ | 5.2 × 10$^5$ | 5.8 × 10$^4$ | ○ | ○ | — | ○ |
|  | 17 | 147 | ○ | 5.8 × 10$^5$ | 6.4 × 10$^4$ | ○ | ○ | — | ○ |
|  | 18 | 136 | ○ | 6.0 × 10$^5$ | 6.7 × 10$^4$ | ○ | ○ | — | ○ |
|  | 19 | 138 | ○ | 5.1 × 10$^5$ | 5.7 × 10$^4$ | ○ | ○ | — | ○ |
|  | 20 | 140 | ○ | 5.3 × 10$^5$ | 5.9 × 10$^4$ | ○ | ○ | — | ○ |

TABLE 8

|  | No. | Alloy 1st Brazing Filler Metal | Alloy Intermediate Layer Material | Alloy Core Material | Alloy 2nd Brazing Filler Metal | Alloy Sacrificial Anode Material | Step | Manufacturability | Brazability 1st Brazing Filler Metal | Brazability 2nd Brazing Filler Metal |
|---|---|---|---|---|---|---|---|---|---|---|
| Comparative Example | 21 | A13 | B1 | C1 | — | — | F1 | ○ | ○ | — |
|  | 22 | A14 | B1 | C1 | — | — | F1 | ○ | x | — |
|  | 23 | A15 | B1 | C1 | — | — | F1 | ○ | x | — |
|  | 24 | A16 | B1 | C1 | — | — | F1 | ○ | ○ | — |
|  | 25 | A17 | B1 | C1 | — | — | F1 | ○ | ○ | — |
|  | 26 | A18 | B1 | C1 | — | — | F1 | x | — | — |
|  | 27 | A19 | B1 | C1 | — | — | F1 | x | — | — |
|  | 28 | A20 | B1 | C1 | — | — | F1 | ○ | x | — |
|  | 29 | A21 | B1 | C1 | — | — | F1 | ○ | x | — |
|  | 30 | A22 | B1 | C1 | — | — | F1 | ○ | ○ | — |
|  | 31 | A23 | B1 | C1 | — | — | F1 | ○ | ○ | — |
|  | 32 | A1 | B10 | C1 | — | — | F1 | ○ | x | — |
|  | 33 | A1 | B11 | C1 | — | — | F1 | x | — | — |
|  | 34 | A1 | B12 | C1 | — | — | F1 | x | — | — |
|  | 35 | A1 | B13 | C1 | — | — | F1 | ○ | ○ | — |
|  | 36 | A1 | B14 | C1 | — | — | F1 | ○ | ○ | — |
|  | 37 | A1 | B15 | C1 | — | — | F1 | x | — | — |
|  | 38 | A1 | B16 | C1 | — | — | F1 | ○ | ○ | — |
|  | 39 | A1 | B17 | C1 | — | — | F1 | ○ | ○ | — |
|  | 40 | A1 | B1 | C9 | — | — | F1 | ○ | x | — |
|  | 41 | A1 | B1 | C10 | — | — | F1 | ○ | x | — |
|  | 42 | A1 | B1 | C11 | — | — | F1 | x | — | — |
|  | 43 | A1 | B1 | C12 | — | — | F1 | x | — | — |
|  | 44 | A1 | B1 | C13 | — | — | F1 | x | — | — |
|  | 45 | A1 | B1 | C14 | — | — | F1 | x | — | — |
|  | 46 | A1 | B1 | C15 | — | — | F1 | ○ | ○ | — |

TABLE 8-continued

| | No. | Tensile Strength After Brazing Heating Measurement (MPa) | Tensile Strength After Brazing Heating Evaluation | Existence Density of Al—Mn Intermetallic Compounds having Circle-Equivalent Dia. 0.1-1.0 µm Before Brazing (pcs/mm²) | Existence Density of Al—Mn Intermetallic Compounds having Circle-Equivalent Dia. 0.1-1.0 µm After Brazing (pcs/mm²) | Corrosion Resistance 1st Brazing Filler Metal Flat Portion | Corrosion Resistance 1st Brazing Filler Metal Joint Portion | 2nd Brazing Filler Metal | Sacrificial Anode Material |
|---|---|---|---|---|---|---|---|---|---|
| Comparative Example | 21 | 142 | ○ | 5.2 × 10⁵ | 5.8 × 10⁴ | x | ○ | — | — |
| | 22 | — | — | 4.6 × 10⁵ | — | — | — | — | — |
| | 23 | — | — | 4.9 × 10⁵ | — | — | — | — | — |
| | 24 | 138 | ○ | 5.2 × 10⁵ | 5.8 × 10⁴ | ○ | x | — | — |
| | 25 | 148 | ○ | 5.8 × 10⁵ | 6.4 × 10⁴ | x | ○ | — | — |
| | 26 | — | — | — | — | — | — | — | — |
| | 27 | — | — | — | — | — | — | — | — |
| | 28 | — | — | 5.3 × 10⁵ | — | — | — | — | — |
| | 29 | — | — | 5.7 × 10⁵ | — | — | — | — | — |
| | 30 | 142 | ○ | 5.6 × 10⁵ | 6.2 × 10⁴ | x | ○ | — | — |
| | 31 | 141 | ○ | 5.6 × 10⁵ | 6.2 × 10⁴ | x | ○ | — | — |
| | 32 | — | — | 6.3 × 10⁵ | — | — | — | — | — |
| | 33 | — | — | — | — | — | — | — | — |
| | 34 | — | — | — | — | — | — | — | — |
| | 35 | 143 | ○ | 5.3 × 10⁵ | 5.9 × 10⁴ | x | ○ | — | — |
| | 36 | 141 | ○ | 6.0 × 10⁵ | 6.7 × 10⁴ | x | ○ | — | — |
| | 37 | — | — | — | — | — | — | — | — |
| | 38 | 141 | ○ | 0.8 × 10⁵ | 0.9 × 10⁴ | x | ○ | — | — |
| | 39 | 148 | ○ | 10.7 × 10⁵ | 11.2 × 10⁴ | x | ○ | — | — |
| | 40 | — | — | 5.2 × 10⁵ | — | — | — | — | — |
| | 41 | — | — | 5.9 × 10⁵ | — | — | — | — | — |
| | 42 | — | — | — | — | — | — | — | — |
| | 43 | — | — | — | — | — | — | — | — |
| | 44 | — | — | — | — | — | — | — | — |
| | 45 | — | — | — | — | — | — | — | — |
| | 46 | 118 | x | 5.2 × 10⁵ | 5.8 × 10⁴ | ○ | ○ | — | — |

TABLE 9

| | | Alloy | | | | | | Brazability | | |
|---|---|---|---|---|---|---|---|---|---|---|
| | No. | 1st Brazing Filler Metal | Intermediate Layer Material | Core Material | 2nd Brazing Filler Metal | Sacrificial Anode Material | Step | Manufacturability | 1st Brazing Filler Metal | 2nd Brazing Filler Metal |
| Comparative Example | 47 | A1 | B1 | C1 | D12 | — | F1 | ○ | ○ | x |
| | 48 | A1 | B1 | C1 | D13 | — | F1 | ○ | ○ | x |
| | 49 | A1 | B1 | C1 | D14 | — | F1 | ○ | ○ | x |
| | 50 | A1 | B1 | C1 | D15 | — | F1 | x | — | — |
| | 51 | A1 | B1 | C1 | D16 | — | F1 | x | — | — |
| | 52 | A1 | B1 | C1 | D17 | — | F1 | x | — | — |
| | 53 | A1 | B1 | C1 | D18 | — | F1 | ○ | ○ | x |
| | 54 | A1 | B1 | C1 | D19 | — | F1 | ○ | ○ | x |
| | 55 | A1 | B1 | C1 | D20 | — | F1 | ○ | ○ | ○ |
| | 56 | A1 | B1 | C1 | D21 | — | F1 | ○ | ○ | ○ |
| | 57 | A1 | B1 | C1 | — | E10 | F1 | ○ | ○ | — |
| | 58 | A1 | B1 | C1 | — | E11 | F1 | x | — | — |
| | 59 | A1 | B1 | C1 | — | E12 | F1 | x | — | — |
| | 60 | A1 | B1 | C1 | — | E13 | F1 | ○ | ○ | — |
| | 61 | A1 | B1 | C1 | — | E14 | F1 | ○ | ○ | — |
| | 62 | A1 | B1 | C1 | — | E15 | F1 | x | — | — |
| | 63 | A1 | B1 | C1 | — | E16 | F1 | x | — | — |

TABLE 9-continued

| | No. | Tensile Strength After Brazing Heating Measurement (MPa) | Tensile Strength After Brazing Heating Evaluation | Existence Density of Al—Mn Intermetallic Compounds having Circle-Equivalent Dia. 0.1-1.0 µm Before Brazing (pcs/mm$^2$) | Existence Density of Al—Mn Intermetallic Compounds having Circle-Equivalent Dia. 0.1-1.0 µm After Brazing (pcs/mm$^2$) | Corrosion Resistance 1st Brazing Filler Metal Flat Portion | Corrosion Resistance 1st Brazing Filler Metal Joint Portion | Corrosion Resistance 2nd Brazing Filler Metal | Corrosion Resistance Sacrificial Anode Material |
|---|---|---|---|---|---|---|---|---|---|
| Comparative Example | 47 | — | — | — | — | — | — | — | — |
| | 48 | — | — | — | — | — | — | — | — |
| | 49 | — | — | — | — | — | — | — | — |
| | 50 | — | — | — | — | — | — | — | — |
| | 51 | — | — | — | — | — | — | — | — |
| | 52 | — | — | — | — | — | — | — | — |
| | 53 | — | — | — | — | — | — | — | — |
| | 54 | — | — | — | — | — | — | — | — |
| | 55 | 142 | ○ | 5.6 × 10$^5$ | 6.2 × 10$^4$ | ○ | ○ | x | — |
| | 56 | 145 | ○ | 5.1 × 10$^5$ | 5.7 × 10$^4$ | ○ | ○ | x | — |
| | 57 | 140 | ○ | 6.0 × 10$^5$ | 6.7 × 10$^4$ | ○ | ○ | — | x |
| | 58 | — | — | — | — | — | — | — | — |
| | 59 | — | — | — | — | — | — | — | — |
| | 60 | 137 | ○ | 5.6 × 10$^5$ | 6.2 × 10$^4$ | ○ | ○ | — | x |
| | 61 | 135 | ○ | 5.1 × 10$^5$ | 5.7 × 10$^4$ | ○ | ○ | — | x |
| | 62 | — | — | — | — | — | — | — | — |
| | 63 | — | — | — | — | — | — | — | — |

TABLE 10

| | No. | Alloy 1st Brazing Filler Metal | Alloy Intermediate Layer Material | Alloy Core Material | Alloy 2nd Brazing Filler Metal | Alloy Sacrificial Anode Material | Step | Manufacturability | Brazability 1st Brazing Filler Metal | Brazability 2nd Brazing Filler Metal |
|---|---|---|---|---|---|---|---|---|---|---|
| Example of the Present Disclosure | 64 | A1 | B1 | C1 | — | — | F2 | ○ | ○ | — |
| | 65 | A1 | B1 | C1 | — | — | F3 | ○ | ○ | — |
| | 66 | A1 | B1 | C1 | — | — | F4 | ○ | ○ | — |
| | 67 | A1 | B1 | C1 | — | — | F5 | ○ | ○ | — |
| | 68 | A1 | B1 | C1 | — | — | F6 | ○ | ○ | — |
| Comparative Example | 69 | A1 | B1 | C1 | — | — | F7 | ○ | ○ | — |
| | 70 | A1 | B1 | C1 | — | — | F8 | ○ | ○ | — |
| | 71 | A1 | B1 | C1 | — | — | F9 | ○ | ○ | — |
| | 72 | A1 | B1 | C1 | — | — | F10 | ○ | ○ | — |
| | 73 | A1 | B1 | C1 | — | — | F11 | ○ | ○ | — |
| | 74 | A1 | B1 | C1 | — | — | F12 | x | — | — |

| | No. | Tensile Strength After Brazing Heating Measurement (MPa) | Tensile Strength After Brazing Heating Evaluation | Existence Density of Al—Mn Intermetallic Compounds having Circle-Equivalent Dia. 0.1-1.0 µm Before Brazing (pcs/mm$^2$) | Existence Density of Al—Mn Intermetallic Compounds having Circle-Equivalent Dia. 0.1-1.0 µm After Brazing (pcs/mm$^2$) | Corrosion Resistance 1st Brazing Filler Metal Flat Portion | Corrosion Resistance 1st Brazing Filler Metal Joint Portion | Corrosion Resistance 2nd Brazing Filler Metal | Corrosion Resistance Sacrificial Anode Material |
|---|---|---|---|---|---|---|---|---|---|
| Example of the Present Disclosure | 64 | 142 | ○ | 2.5 × 10$^5$ | 2.8 × 10$^4$ | ○ | ○ | — | — |
| | 65 | 145 | ○ | 2.3 × 10$^5$ | 2.6 × 10$^4$ | ○ | ○ | — | — |
| | 66 | 139 | ○ | 2.1 × 10$^5$ | 2.3 × 10$^4$ | ○ | ○ | — | — |
| | 67 | 144 | ○ | 2.9 × 10$^5$ | 3.2 × 10$^4$ | ○ | ○ | — | — |
| | 68 | 144 | ○ | 2.8 × 10$^5$ | 3.1 × 10$^4$ | ○ | ○ | — | — |
| Comparative Example | 69 | 139 | ○ | 0.7 × 10$^5$ | 0.8 × 10$^4$ | x | ○ | — | — |
| | 70 | 140 | ○ | 0.6 × 10$^5$ | 0.7 × 10$^4$ | x | ○ | — | — |
| | 71 | 144 | ○ | 0.9 × 10$^5$ | 1.0 × 10$^4$ | x | ○ | — | — |

TABLE 10-continued

| | | | | | | | | |
|---|---|---|---|---|---|---|---|---|
| 72 | 142 | ○ | $0.8 \times 10^5$ | $0.9 \times 10^4$ | x | ○ | — | — |
| 73 | 141 | ○ | $0.4 \times 10^5$ | $0.4 \times 10^5$ | x | ○ | — | — |
| 74 | — | — | — | — | — | — | — | — |

In Tables 7 to 10, manufacturability is marked with "○" if the sample was successfully rolled to a final thickness of 0.4 mm without causing any problem in the production steps described above, while manufacturability is marked with "x" if the sample was not rolled to a final thickness of 0.4 mm because a crack developed during the casting or rolling, or if the sample was not formed into a clad material because melting occurred during the heating stage before the hot clad rolling step or during the intermediate annealing step, or because a pressure bonding failure occurred during the heat clad rolling stage.

Tables 7 to 10 show results of the below-mentioned evaluations that were conducted on the above-described clad material samples. Note that the below-mentioned evaluations were not conducted on the samples whose manufacturability is "x" in Tables 8 to 10 because a clad material could not be produced.

(Evaluation of Brazability)

The fin material for a heat exchanger was obtained by preparing and corrugating a fin material having a thickness of 0.07 mm, refining type H14, and the alloy composition of 3003 alloy with 1.0% Zn added. The obtained fin material was disposed on a surface of the first or second brazing filler metal of the clad material sample, dipped in a 5% aqueous solution of fluoride flux, and subjected to brazing heating at 600° C. for 3 minutes, by which a mini-core sample was produced. The brazability was evaluated as acceptable (○) when the mini-core sample exhibited a fin joining ratio of 95% or higher and no melting occurred in the clad material sample nor in the fin material. The brazability was evaluated as unacceptable (x) when (1) the fin joining ratio was less than 95%; and/or (2) melting occurred in at least either one of the clad material sample and the fin.

(Measurement of Tensile Strength after Brazing Heating)

After heat-treated at 600° C. for 3 minutes (equivalent to brazing heating), the clad material sample was subjected to a tensile test according to JIS Z2241 under the conditions: a tension rate of 10 mm/minute and a gauge length of 50 mm. Tensile strength levels were read from the obtained stress-strain curve. A sample was evaluated as acceptable (○) when the tensile strength was 120 MPa or higher, whereas a sample was evaluated as unacceptable (x) when the tensile strength was lower than 120 MPa. The tensile test was omitted for clad material samples evaluated as "x" in brazability.

(Measurement of Density Distribution of Intermetallic Compounds)

To examine Al—Mn based intermetallic compounds that had not been subjected to brazing-equivalent heating and those which had been subjected to a heat treatment at 600° C. for 3 minutes (equivalent to brazing-equivalent heating), a thin film sample was cut out from an L-ST section of the intermediate layer material in each clad material sample by using FIB, and Mn element distribution mapping of the thin film sample was carried out by using energy-dispersive X-ray spectroscopy (EDS) on a scanning transmission electron microscope (STEM). For this purpose, the film thickness of each observed section was measured by using electron energy loss spectroscopy (EELS), and any area falling within 0.10 to 0.15 µm in thickness was observed under STEM. Five fields of view, 10 µm×10 µm each, were observed per sample, and images of Mn mapping of the individual fields of view were analyzed to obtain the existence density distribution of Al—Mn based intermetallic compounds having a circle-equivalent diameter between 0.1 and 1.0 µm inclusive. The measurement of density distribution of the intermetallic compounds after brazing heating was omitted for clad material samples evaluated as "x" in brazability.

(Evaluation of Corrosion Resistance)

Corrosion resistance of the first brazing filler metal was evaluated as described below. The clad material sample was totally coated with a flux of 5 g/m², surfaces of the first brazing filler metal were overlapped, and then the clad material was subjected to brazing heating at 600° C. for 3 minutes. A test sample was prepared by cutting out a rectangle, 3 cm wide and 7 cm long, from the resulting material and masking the outer surface opposite to the first brazing filler metal with an insulative resin. The test samples were subjected to a three-month cyclic immersion test, where each cycle includes immersing the test samples in hot water at 88° C. containing $Cl^-$ 500 ppm, $SO_4^{2-}$ 100 ppm, and $Cu^{2+}$ 10 ppm for 8 hours, followed by leaving the samples at room temperature for 16 hours. Then, corrosion products were removed by dipping the test samples in concentrated nitric acid, and the samples were examined to find whether corrosion perforation had occurred in a flat portion and a joint portion in the first brazing filler metal. Any sample where no corrosion perforation had occurred in either of the flat and joint portions was evaluated as acceptable (○) in corrosion resistance. Any sample where corrosion perforation had occurred at least either one of the flat and joint portions was evaluated as unacceptable (x) in corrosion resistance.

Concerning the samples where the second brazing filler metal contains Zn, a corrosion resistance test sample was prepared by using the mini-core sample (with the second brazing filler metal surface brazed) that had been used for evaluating brazability, and masking the surface opposite to the fin joint with an insulative resin so that the surface joined with the fin can be tested. Concerning the samples where the sacrificial anode material is clad, a corrosion resistance test sample of the sacrificial anode material was prepared by overlapping surfaces of the sacrificial anode material, subjecting the material to brazing heating at 600° C. for 3 minutes, and masking the surface not being on the side of the sacrificial anode material with an insulative resin.

These corrosion resistance test samples of the second brazing filler metal and sacrificial anode material were subjected to the CASS test for 500 and 1,000 hours according to JIS-H8502. Any sample having caused no corrosion perforation in the clad material in 1,000 hours was evaluated as excellent (⊚) in CASS corrosion resistance, any sample having caused corrosion perforation in the clad material in 1,000 hours but no corrosion perforation in 500 hours was evaluated as acceptable (○) in CASS corrosion resistance, and any sample having caused corrosion perforation in 500 hours was evaluated as unacceptable (x) in CASS corrosion resistance. The evaluation of corrosion resistance on the first brazing filler metal and the second brazing filler metal and sacrificial anode material was omitted for clad material samples evaluated as "x" in brazability.

Examples 1 to 20 and 64 to 68 of the present disclosure, which satisfied the requirements specified in the present disclosure, were acceptable in all items: manufacturability, brazability, tensile strength after brazing, and corrosion resistance.

In contrast, Comparative Example 21 was unacceptable in corrosion resistance of the flat portion on the first brazing filler metal because the Si content of the first brazing filler metal was too low.

Comparative Example 22 was unacceptable in brazability of the first brazing filler metal because the Si content of the first brazing filler metal was too high.

Comparative Example 23 was unacceptable in brazability of the first brazing filler metal because the Fe content of the first brazing filler metal was too high.

Comparative Example 24 was unacceptable in corrosion resistance of the joint portion on the first brazing filler metal because the Cu content of the first brazing filler metal was too low.

Comparative Example 25 was unacceptable in corrosion resistance of the flat portion on the first brazing filler metal because the Cu content of the first brazing filler metal was too high.

Comparative Example 26 was unacceptable in manufacturability because the Mn content of the first brazing filler metal was so high that a crack developed during rolling and the clad material could not be produced.

Comparative Example 27 was unacceptable in manufacturability because the Ti content, the Zr content, the Cr content, and the V content of the first brazing filler metal were so high that a crack developed during rolling and the clad material could not be produced.

Comparative Example 28 was unacceptable in brazability of the first brazing filler metal because the Na content of the first brazing filler metal was too high.

Comparative Example 29 was unacceptable in brazability of the first brazing filler metal because the Sr content of the first brazing filler metal was too high.

Comparative Example 30 was unacceptable in corrosion resistance of the flat portion on the first brazing filler metal because the Zn content of the first brazing filler metal was too low.

Comparative Example 31 was unacceptable in corrosion resistance of the flat portion on the first brazing filler metal because the Zn content of the first brazing filler metal was too high.

Comparative Example 32 was unacceptable in brazability of the first brazing filler metal because the Si content of the intermediate layer material was too high.

Comparative Example 33 was unacceptable in manufacturability because the Fe content of the intermediate layer material was so high that a crack developed during rolling and the clad material could not be produced.

Comparative Example 34 was unacceptable in manufacturability because the Ti content, the Zr content, the Cr content, and the V content of the intermediate layer material were so high that a crack developed during rolling and the clad material could not be produced.

Comparative Example 35 was unacceptable in corrosion resistance of the flat portion on the first brazing filler metal because the Zn content of the intermediate layer material was too low.

Comparative Example 36 was unacceptable in corrosion resistance of the flat portion on the first brazing filler metal because the Zn content of the intermediate layer material was too high.

Comparative Example 37 was unacceptable in manufacturability because the Ni content of the intermediate layer material was so high that a crack developed during rolling and the clad material could not be produced.

Comparative Example 38 was unacceptable in corrosion resistance of the flat portion on the first brazing filler metal because the Mn content of the intermediate layer material was too low.

Comparative Example 39 was unacceptable in corrosion resistance of the flat portion on the first brazing filler metal because the Mn content of the intermediate layer material was too high.

Comparative Example 40 was unacceptable in brazability of the first brazing filler metal because the Si content of the core material was too high.

Comparative Example 41 was unacceptable in brazability of the first brazing filler metal because the Mg content of the core material was too high.

Comparative Example 42 was unacceptable in manufacturability because the Fe content of the core material was so high that a crack developed during rolling and the clad material could not be produced.

Comparative Example 43 was unacceptable in manufacturability because the Ti content, the Zr content, the Cr content, and the V content of the core material were so high that a crack developed during rolling and the clad material could not be produced.

Comparative Example 44 was unacceptable in manufacturability because the Mn content of the core material was so high that a crack developed during rolling and the clad material could not be produced.

Comparative Example 45 was unacceptable in manufacturability because the Cu content of the core material was so high that a crack developed during rolling and the clad material could not be produced.

Comparative Example 46 was unacceptable in strength after brazing because the Mn content of the core material was too low.

Comparative Example 47 was unacceptable in brazability of the second brazing filler metal because the Si content of the second brazing filler metal was too low.

Comparative Example 48 was unacceptable in brazability of the second brazing filler metal because the Si content of the second brazing filler metal was too high.

Comparative Example 49 was unacceptable in brazability of the second brazing filler metal because the Fe content of the second brazing filler metal was too high.

Comparative Example 50 was unacceptable in manufacturability because the Cu content of the second brazing filler metal was so high that a crack developed during casting and the clad material could not be produced.

Comparative Example 51 was unacceptable in manufacturability because the Mn content of the second brazing filler metal was so high that a crack developed during rolling and the clad material could not be produced.

Comparative Example 52 was unacceptable in manufacturability because the Ti content, the Zr content, the Cr content, and the V content of the second brazing filler metal were so high that a crack developed during rolling and the clad material could not be produced.

Comparative Example 53 was unacceptable in brazability of the second brazing filler metal because the Na content of the second brazing filler metal was too high.

Comparative Example 54 was unacceptable in brazability of the second brazing filler metal because the Sr content of the second brazing filler metal was too high.

Comparative Example 55 was unacceptable in corrosion resistance on the second brazing filler metal side because the Zn content of the second brazing filler metal was too low.

Comparative Example 56 was unacceptable in corrosion resistance on the second brazing filler metal side because the Zn content of the second brazing filler metal was too high.

Comparative Example 57 was unacceptable in corrosion resistance of the sacrificial anode material side because the Si content of the sacrificial anode material was too high.

Comparative Example 58 was unacceptable in manufacturability because the Fe content of the sacrificial anode material was so high that a crack developed during rolling and the clad material could not be produced.

Comparative Example 59 was unacceptable in manufacturability because the Ti content, the Zr content, the Cr content, and the V content of the sacrificial anode material were so high that a crack developed during rolling and the clad material could not be produced.

Comparative Example 60 was unacceptable in corrosion resistance of the sacrificial anode material side because the Zn content of the sacrificial anode material was too low.

Comparative Example 61 was unacceptable in corrosion resistance of the sacrificial anode material side because the Zn content of the sacrificial anode material was too high.

Comparative Example 62 was unacceptable in manufacturability because the Ni content of the sacrificial anode material was so high that a crack developed during rolling and the clad material could not be produced.

Comparative Example 63 was unacceptable in manufacturability because the Mn content of the sacrificial anode material was so high that a crack developed during rolling and the clad material could not be produced.

Comparative Example 69 was unacceptable in corrosion resistance of the flat portion on the first brazing filler metal side because the rate of temperature rise was too low up to 400° C. in the heating stage during the step of hot rolling the intermediate layer material, and thus the distribution of Al—Mn based intermetallic compounds obtained after brazing heating was not satisfactory.

Comparative Example 70 was unacceptable in corrosion resistance of the flat portion on the first brazing filler metal side because the rate of temperature rise was too high from 400° C. attained in the heating stage during the step of hot rolling the intermediate layer material to the holding temperature in the holding stage, and thus the distribution of Al—Mn based intermetallic compounds obtained after brazing heating was not satisfactory.

Comparative Example 71 was unacceptable in corrosion resistance of the flat portion on the first brazing filler metal side because the holding temperature in the holding stage during the step of hot rolling the intermediate layer material was so low that the distribution of Al—Mn based intermetallic compounds obtained after brazing heating was not satisfactory.

Comparative Example 72 was unacceptable in corrosion resistance of the flat portion on the first brazing filler metal side because the holding time in the holding stage during the step of hot rolling the intermediate layer material was so short that the distribution of Al—Mn based intermetallic compounds obtained after brazing heating was not satisfactory.

Comparative Example 73 was unacceptable in corrosion resistance of the flat portion on the first brazing filler metal side because the time period during which the intermediate layer material was at 400° C. or higher during the hot rolling step was so short that the distribution of Al—Mn based intermetallic compounds obtained after brazing heating was not satisfactory.

Comparative Example 74 was unacceptable in manufacturability because the holding temperature in the holding stage during the step of hot rolling the intermediate layer material was so high that the intermediate layer material melted, and thus the clad material could not be produced.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application is based on Japanese Patent Application No. 2015-137332 filed on Jul. 8, 2015, and on Japanese Patent Application No. 2016-132728 filed on Jul. 4, 2016. The descriptions, claims, and drawings of Japanese Patent Application No. 2015-137332 and Japanese Patent Application No. 2016-132728 are incorporated herein by reference in their entirety.

INDUSTRIAL APPLICABILITY

The aluminum alloy clad material according to the present disclosure is suitably used as, among others, a passage forming component for an automotive heat exchanger because the clad material is excellent not only in corrosion resistance but also in brazability such as fin joining ratios and erosion resistance.

REFERENCE SIGNS LIST

1 Plate
2 Corrugated fin

The invention claimed is:
1. An aluminum alloy clad material comprising:
a core material comprising an aluminum alloy;
an intermediate layer material that is clad on one surface of the core material; and
a first brazing filler metal that is clad on a surface of the intermediate layer material, the surface not being on the core material side,
wherein the core material comprises an aluminum alloy consisting of Si: 0.05 to 1.50 mass %, Fe: 0.05 to 2.00 mass %, Mn: 0.5 to 2.0 mass %, and optionally at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %, with a balance of the aluminum alloy being Al and inevitable impurities,
wherein the intermediate layer material comprises an aluminum alloy consisting of Zn: 0.5 to 8.0 mass %, Si: 0.05 to 1.50 mass %, Fe: 0.05 to 2.00 mass %, Mn: 0.05 to 0.50 mass %, and optionally at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %, with the balance of the aluminum alloy being Al and inevitable impurities, wherein the first brazing filler metal comprises an aluminum alloy consisting of Si: 8.0 to 13.0 mass %, Fe: 0.05 to 1.20 mass %, Cu: 0.05 to 0.50 mass %, and optionally:
(1) at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %,
(2) at least one selected from Na: 0.001 to 0.050 mass % and Sr: 0.001 to 0.050 mass %, or
a combination of (1) and (2),
with the balance of the aluminum alloy being Al and inevitable impurities,
wherein an existence density of Al—Mn based intermetallic compounds having a circle-equivalent diameter between 0.1 and 1.0 μm inclusive in the intermediate layer material before brazing heating is at least $1.0 \times 10^5$ pieces/mm$^2$, and
wherein an existence density of Al—Mn based intermetallic compounds having a circle-equivalent diameter between 0.1 and 1.0 μm inclusive in the intermediate layer material after brazing heating at 600° C. is at least $1.0 \times 10^4$ pieces/mm$^2$.

2. A method for producing the aluminum alloy clad material according to claim 1, the method comprising:
a step of casting the aluminum alloys for the core material, the intermediate layer material, and the first brazing filler metal, respectively;
a hot rolling step of hot rolling each of ingots of the cast intermediate layer material and the cast first brazing filler metal to a predetermined thickness;
a cladding step of obtaining a clad material by cladding the intermediate layer material that has been hot rolled to a predetermined thickness on one surface of the ingot of the core material, and by cladding the first brazing filler metal that has been hot rolled to a predetermined thickness on a surface of the clad intermediate layer material, the surface not being on the core material side;
a hot clad rolling step of hot rolling the clad material;
a cold rolling step of cold rolling the clad material that has been hot clad rolled; and
at least one annealing step of annealing the clad material carried out during or after the cold rolling step or during and after the cold rolling step,
wherein the step of hot rolling the intermediate layer material comprises a heating stage, a holding stage, and a hot rolling stage,
wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower,
wherein, in the holding stage, the holding temperature is between 450 and 650° C. inclusive and a holding time is at least one hour, and
wherein a time period during which the intermediate layer material is at a temperature of at least 400° C. in the hot rolling stage is at least 5 minutes.

3. An aluminum alloy clad material comprising:
a core material comprising an aluminum alloy;
an intermediate layer material that is clad on one surface of the core material;
a first brazing filler metal that is clad on a surface of the intermediate layer material, the surface not being on the core material side; and
a second brazing filler metal that is clad on another surface of the core material,
wherein the core material comprises an aluminum alloy consisting of Si: 0.05 to 1.50 mass %, Fe: 0.05 to 2.00 mass %, Mn: 0.5 to 2.0 mass %, and optionally at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %, with a balance of the aluminum alloy being Al and inevitable impurities,
wherein the intermediate layer material comprises an aluminum alloy consisting of Zn: 0.5 to 8.0 mass %, Si: 0.05 to 1.50 mass %, Fe: 0.05 to 2.00 mass %, Mn: 0.05 to 0.50 mass %, and optionally at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %, with the balance of the aluminum alloy being Al and inevitable impurities,
wherein the first brazing filler metal comprises an aluminum alloy consisting of Si: 8.0 to 13.0 mass %, Fe: 0.05 to 1.20 mass %, Cu: 0.05 to 0.50 mass %, and optionally:
(1) at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %,
(2) at least one selected from Na: 0.001 to 0.050 mass % and Sr: 0.001 to 0.050 mass %, or
a combination of (1) and (2),
with the balance of the aluminum alloy being Al and inevitable impurities,
wherein the second brazing filler metal comprises an aluminum alloy consisting of Si: 2.5 to 13.0 mass Fe: 0.05 to 1.20 mass %, and optionally:
(3) at least one selected from Zn: 0.5 to 8.0 mass %, Cu: 0.05 to 1.50 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.3 mass %,
(4) at least one selected from Na: 0.001 to 0.050 mass % and Sr: 0.001 to 0.050 mass %, or
a combination of (3) and (4),
with the balance of the aluminum alloy being Al and inevitable impurities,
wherein an existence density of Al—Mn based intermetallic compounds having a circle-equivalent diameter between 0.1 and 1.0 μm inclusive in the intermediate layer material before brazing heating is at least $1.0 \times 10^5$ pieces/mm$^2$, and
wherein an existence density of Al—Mn based intermetallic compounds having a circle-equivalent diameter between 0.1 and 1.0 μm inclusive in the intermediate layer material after brazing heating at 600° C. is at least $1.0 \times 10^4$ pieces/mm$^2$.

4. A method for producing the aluminum alloy clad material according to claim 3, the method comprising:
a step of casting the aluminum alloys for the core material, the intermediate layer material, the first brazing filler metal, and the second brazing filler metal, respectively;
a hot rolling step of hot rolling each of ingots of the cast intermediate layer material, the cast first brazing filler metal, and the cast second brazing filler metal to a predetermined thickness;
a cladding step of obtaining a clad material by cladding the intermediate layer material that has been hot rolled to a predetermined thickness on one surface of the ingot of the core material, by cladding the first brazing filler metal that has been hot rolled to a predetermined thickness on a surface of the clad intermediate layer material, the surface not being on the core material side, and by cladding the second brazing filler metal that has been hot rolled to a predetermined thickness on another surface of the ingot of the core material;

a hot clad rolling step of hot rolling the clad material;

a cold rolling step of cold rolling the clad material that has been hot clad rolled; and at least one annealing step of annealing the clad material carried out during or after the cold rolling step or during and after the cold rolling step, wherein the step of hot rolling the intermediate layer material comprises a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 650° C. inclusive and a holding time is at least one hour, and wherein a time period during which the intermediate layer material is at a temperature of at least 400° C. in the hot rolling stage is at least 5 minutes.

5. An aluminum alloy clad material comprising:

a core material comprising an aluminum alloy;

an intermediate layer material that is clad on one surface of the core material;

a first brazing filler metal that is clad on a surface of the intermediate layer material, the surface not being on the core material side; and a sacrificial anode material that is clad on another surface of the core material, wherein the core material comprises an aluminum alloy consisting of Si: 0.05 to 1.50 mass %, Fe: 0.05 to 2.00 mass %, Mn: 0.5 to 2.0 mass %, and optionally at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %, with a balance of the aluminum alloy being Al and inevitable impurities, wherein the intermediate layer material comprises an aluminum alloy consisting of Zn: 0.5 to 8.0 mass %, Si: 0.05 to 1.50 mass %, Fe: 0.05 to 2.00 mass %, Mn: 0.05 to 0.50 mass %, and optionally at least one selected from Ni: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %, with the balance of the aluminum alloy being Al and inevitable impurities, wherein the first brazing filler metal comprises an aluminum alloy consisting of Si: 8.0 to 13.0 mass %, Fe: 0.05 to 1.20 mass %, Cu: 0.05 to 0.50 mass %, and optionally:

(1) at least one selected from Zn: 0.5 to 8.0 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %, (2) at least one selected from Na: 0.001 to 0.050 mass % and Sr: 0.001 to 0.050 mass %, or a combination of (1) and (2), with the balance of the aluminum alloy being Al and inevitable impurities, wherein the sacrificial anode material comprises an aluminum alloy consisting of Zn: 0.5 to 8.0 mass %, Si: 0.05 to 1.50 mass %, Fe: 0.05 to 2.00 mass %, and optionally at least one selected from Ni: 0.05 to 2.00 mass %, Mn: 0.05 to 2.00 mass %, Ti: 0.05 to 0.30 mass %, Zr: 0.05 to 0.30 mass %, Cr: 0.05 to 0.30 mass %, and V: 0.05 to 0.30 mass %, with the balance of the aluminum alloy being Al and inevitable impurities, wherein an existence density of Al—Mn based intermetallic compounds having a circle-equivalent diameter between 0.1 and 1.0 μm inclusive in the intermediate layer material before brazing heating is at least $1.0 \times 10^5$ pieces/mm², and wherein an existence density of Al—Mn based intermetallic compounds having a circle-equivalent diameter between 0.1 and 1.0 μm inclusive in the intermediate layer material after brazing heating at 600° C. is at least $1.0 \times 10^4$ pieces/mm².

6. A method for producing the aluminum alloy clad material according to claim 5, the method comprising:

a step of casting the aluminum alloys for the core material, the intermediate layer material, the first brazing filler metal material, and the sacrificial anode material, respectively;

a hot rolling step of hot rolling each of ingots of the cast intermediate layer material, the cast first brazing filler metal, and the cast sacrificial anode material to a predetermined thickness;

a cladding step of obtaining a clad material by cladding the intermediate layer material that has been hot rolled to a predetermined thickness on one surface of the ingot of the core material, by cladding the first brazing filler metal that has been hot rolled to a predetermined thickness on a surface of the clad intermediate layer material, the surface not being on the core material side, and by cladding the sacrificial anode material that has been hot rolled to a predetermined thickness on another surface of the ingot of the core material;

a hot clad rolling step of hot rolling the clad material;

a cold rolling step of cold rolling the clad material that has been hot clad rolled; and at least one annealing step of annealing the clad material carried out during or after the cold rolling step or during and after the cold rolling step, wherein the step of hot rolling the intermediate layer material comprises a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 650° C. inclusive and a holding time is at least one hour, and wherein a time period during which the intermediate layer material is at a temperature of at least 400° C. in the hot rolling stage is at least 5 minutes.

* * * * *